United States Patent [19]

Asano

[11] Patent Number: 5,361,220
[45] Date of Patent: Nov. 1, 1994

[54] DISCRETE COSINE TRANSFORMATION WITH REDUCED COMPONENTS

[75] Inventor: Masanari Asano, Miyagi, Japan

[73] Assignee: Fuji Photo Film Co., Ltd., Kanagawa, Japan

[21] Appl. No.: 982,623

[22] Filed: Nov. 27, 1992

[30] Foreign Application Priority Data

Nov. 29, 1991 [JP] Japan ................................. 3-316864
Nov. 29, 1991 [JP] Japan ................................. 3-316865
Feb. 7, 1992 [JP] Japan ................................. 4-022687

[51] Int. Cl.⁵ .......................................... G06F 15/332
[52] U.S. Cl. ...................................................... 364/725
[58] Field of Search ............... 364/725, 757, 758, 759, 364/760, 750.5

[56] References Cited

U.S. PATENT DOCUMENTS

| | | | |
|---|---|---|---|
| 3,670,956 | 6/1972 | Calhoun | 364/758 |
| 4,293,920 | 10/1981 | Merola | 364/725 |
| 4,336,600 | 6/1982 | Houdard et al. | 364/785 |
| 4,745,570 | 5/1988 | Diedrich et al. | 364/760 |
| 4,791,598 | 12/1988 | Liou et al. | 364/725 |
| 4,791,601 | 12/1988 | Tanaka | 364/760 |

*Primary Examiner*—David H. Malzahn
*Attorney, Agent, or Firm*—Sughrue, Mion, Zinn Macpeak & Seas

[57] ABSTRACT

A discrete cosine transformation processor includes first and second one-dimensional discrete cosine transformation circuits, a pre-processing circuit connected to the input of the one-dimensional discrete cosine processing circuit, and a post-processing circuit connected to the output of the one-dimensional discrete cosine processing circuit. The pre-processing circuit of the first one-dimensional discrete cosine processing circuit and the post-processing circuit of said second one-dimensional discrete cosine transformation circuit includes a shared first butterfly circuit, and the post-processing circuit of the first one-dimensional discrete cosine transformation circuit and the pre-processing circuit of the second one-dimensional discrete cosine transformation circuit includes a shared second butterfly circuit. A look-up table is used for two bits of each of two elements to a DCT matrix. The shared portion of the look-up tables can be extended for use with the forward and inverse DCT processing. A discrete cosine transformation processor includes a calculation block for sequentially performing a calculation for a predetermined bit position of each of a set of input signals, an adder/subtracter connected to the calculation block, a shift register for sequentially storing the established portion of an output signal of the adder/subtracter, and a resister for sequentially storing the carry portion used for the addition/subtraction at the next calculation cycle.

11 Claims, 14 Drawing Sheets

FIG. 3A
PRIOR ART
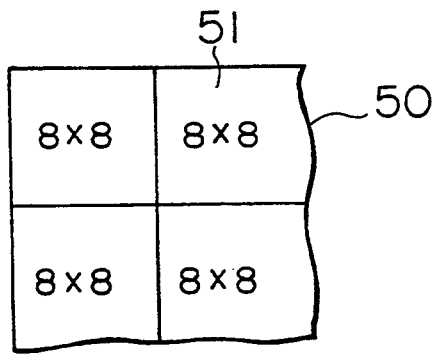
FIG. 3B
PRIOR ART
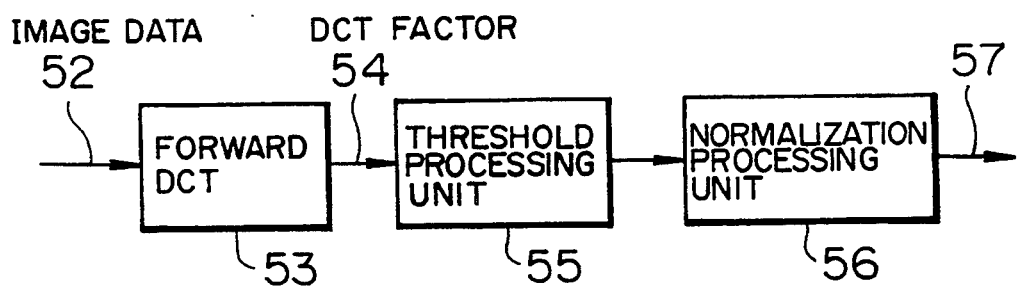
FIG. 3C
PRIOR ART
$$\begin{Bmatrix} F_{00} & F_{10} \\ F_{01} & ---- \\ \vdots & \end{Bmatrix} = \begin{Bmatrix} \text{TRANSPOSED} \\ \text{COSINE} \\ \text{FACTOR} \\ \text{MATRIX} \end{Bmatrix} \times \begin{Bmatrix} f_{00} & f_{10} \\ f_{01} & ---- \\ \vdots & \end{Bmatrix} \times \begin{Bmatrix} \text{COSINE} \\ \text{FACTOR} \\ \text{MATRIX} \end{Bmatrix}$$

FIG. 4A

FORWARD/INVERSE DCT MATRICES $$D = \begin{pmatrix} 4096 & 5681 & 5352 & 4816 & 4096 & 3218 & 2217 & 1130 \\ 4096 & 4816 & 2217 & -1130 & -4096 & -5681 & -5352 & -3218 \\ 4096 & 3218 & -2217 & -5681 & -4096 & 1130 & 5352 & 4816 \\ 4096 & 1130 & -5352 & -3218 & 4096 & 4816 & -2217 & -5681 \\ 4096 & -1130 & -5352 & 3218 & 4096 & -4816 & -2217 & 5681 \\ 4096 & -3218 & -2217 & 5681 & -4096 & -1130 & 5352 & -4816 \\ 4096 & -4816 & 2217 & 1130 & -4096 & 5681 & -5352 & 3218 \\ 4096 & -5681 & 5352 & -4816 & 4096 & -3218 & 2217 & -1130 \end{pmatrix}$$

$$D^t = \begin{pmatrix} 4096 & 4096 & 4096 & 4096 & 4096 & 4096 & 4096 & 4096 \\ 5681 & 4816 & 3218 & 1130 & -1130 & -3218 & -4816 & -5681 \\ 5352 & 2217 & -2217 & -5352 & -5352 & -2217 & 2217 & 5352 \\ 4816 & -1130 & -5681 & -3218 & 3218 & 5681 & 1130 & -4816 \\ 4096 & -4096 & -4096 & 4096 & 4096 & -4096 & -4096 & 4096 \\ 3218 & -5681 & 1130 & 4816 & -4816 & -1130 & 5681 & -3218 \\ 2217 & -5352 & 5352 & -2217 & -2217 & 5352 & -5352 & 2217 \\ 1130 & -3218 & 4816 & -5681 & 5681 & -4816 & 3218 & -1130 \end{pmatrix}$$

FIG. 4B

EVEN ROWS OF $D^t$

| $5681 = D_{12}$ | $4816 = D_{14}$ | $3218 = D_{16}$ | $1130 = D_{18}$ |
| $4816 = D_{22}$ | $-1130 = D_{24}$ | $-5681 = D_{26}$ | $-3218 = D_{28}$ |
| $3218 = D_{32}$ | $-5681 = D_{34}$ | $1130 = D_{36}$ | $4816 = D_{38}$ |
| $1130 = D_{42}$ | $-3218 = D_{44}$ | $4816 = D_{46}$ | $-5681 = D_{48}$ |

FIG. 4C

ODD ROWS OF $D^t$

| $4096 = D_{11}$ | 4096 | $4096 = D_{15}$ | 4096 |
| 5352 | $2217 = D_{23}$ | $-2217$ | $-5352 = D_{27}$ |
| $4096 = D_{31}$ | $-4096$ | $-4096 = D_{35}$ | 4096 |
| 2217 | $5352 = D_{43}$ | 5352 | $-2217 = D_{47}$ |

| SYMMETRY OF LUT | | | | | |
|---|---|---|---|---|---|
| X4 | X3 | X2 | X1 | CONTENTS | CHANGED CONTENTS |
| 0 | 0 | 0 | 0 | 0 | −8192.0 |
| 0 | 0 | 0 | 1 | 4096 | −4096.0 |
| 0 | 0 | 1 | 0 | 4096 | −4096.0 |
| 0 | 0 | 1 | 1 | 8192 | 0.0 |
| 0 | 1 | 0 | 0 | 4096 | −4096.0 |
| 0 | 1 | 0 | 1 | 8192 | 0.0 |
| 0 | 1 | 1 | 0 | 8192 | 0.0 |
| 0 | 1 | 1 | 1 | 12288 | 4096.0 |
| 1 | 0 | 0 | 0 | 4096 | −4096.0 |
| 1 | 0 | 0 | 1 | 8192 | 0.0 |
| 1 | 0 | 1 | 0 | 8192 | 0.0 |
| 1 | 0 | 1 | 1 | 12288 | 4096.0 |
| 1 | 1 | 0 | 0 | 8192 | 0.0 |
| 1 | 1 | 0 | 1 | 12288 | 4096.0 |
| 1 | 1 | 1 | 0 | 12288 | 4096.0 |
| 1 | 1 | 1 | 1 | 16384 | 8192.0 |

FIG.10
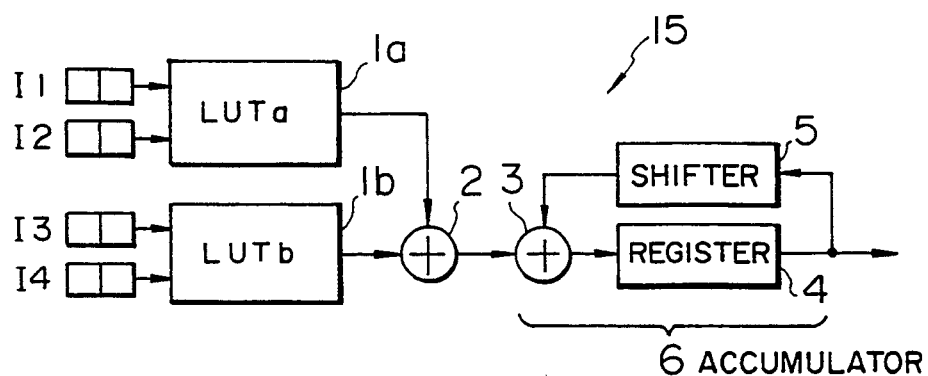
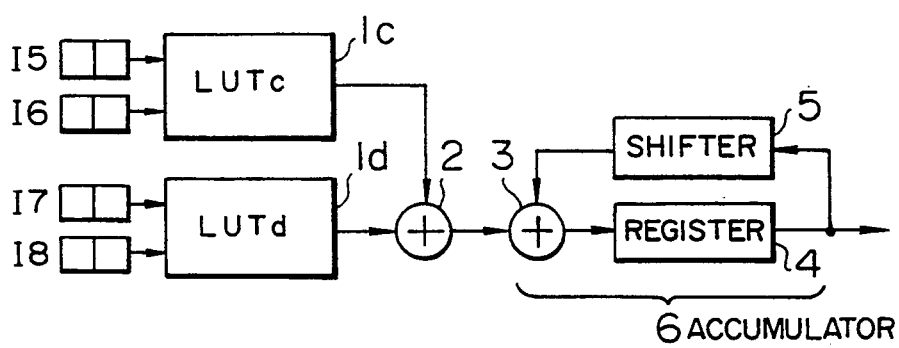
FIG.11
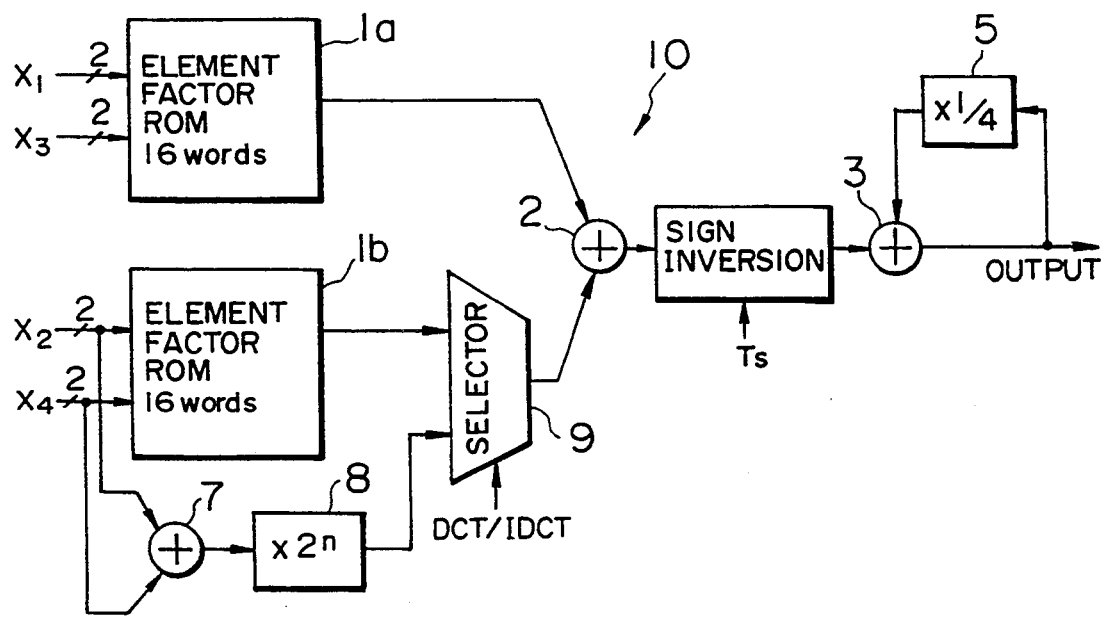

FIG. 15A
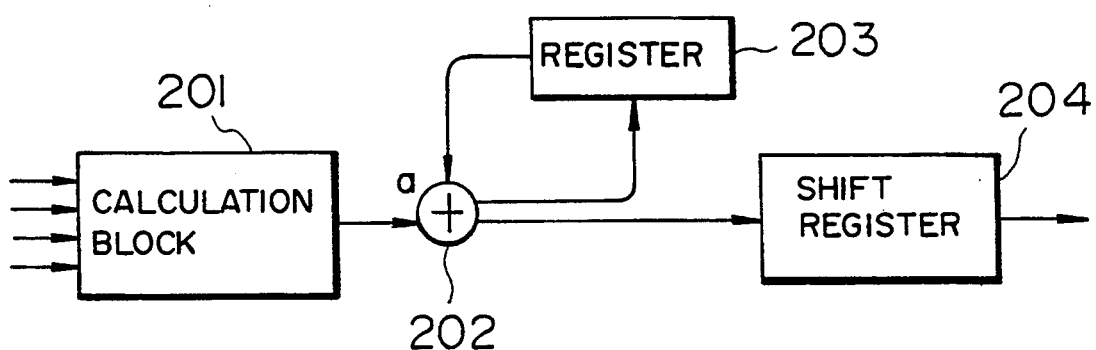
FIG. 15B
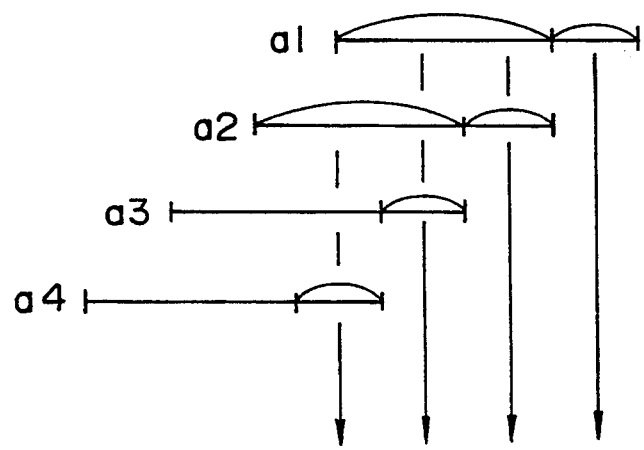
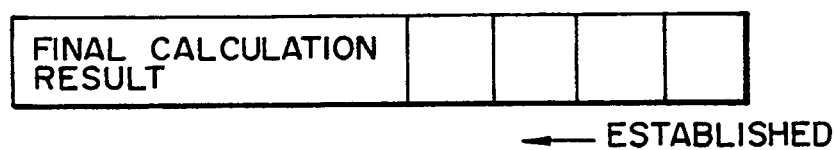

DISCRETE COSINE TRANSFORMATION WITH REDUCED COMPONENTS

BACKGROUND OF THE INVENTION a) Field of the Invention

The present invention relates to a technique of discrete cosine transformation (DCT), and more particularly to a discrete cosine transformation unit for performing two-dimensional discrete cosine transformations.

DCT is known as a transformation method suitable for image data compression. DCTs include a DCT in the forward direction for transforming image data into frequency components and a DCT in the backward direction for recovering the original image data by inversely transforming the frequency components. In this specification, both types of DCTs are represented by a term DCT, and discriminated by calling either a forward direction (forward) DCT or a backward (inverse) DCT.

b) Description of the Related Art

DCT which is one of orthogonal transformation methods is widely used nowadays as a data compression method.

FIGS. 3A to 3C are exemplary diagrams explaining an image data compressing technique.

As shown in FIG. 3A, a frame 50 to be processed is divided into small sub-frames 51 each having a size of 8*8 pixels for example. Each sub-frame 51 constitutes a square matrix of 8 rows and 8 columns having 64 matrix elements. Image information of the frame 50 is processed in units of the sub-frame 51.

As shown in FIG. 3B, a sub frame 51 of image data 52 is processed by a forward direction DCT processing unit 53 to obtain a DCT factor (F) 54. The DCT factor is obtained by frequency analyzing the image information in the row direction and column direction. The DCT factor 54 is processed by a threshold processing unit 55 to discard data having a value equal to or smaller than a predetermined value. Next, in order to shorten the length or non-zero data, the data is divided by a predetermined value by a normalization processing unit 56 to obtain data with a shortened length.

the image data 57 obtained in the manner described above includes non-zero data and zero data, most of high frequency components being zero data. The non-zero data is encoded by the Hafman Huffman encoding method to further compress the image data. The zero data is encoded by the run-length encoding method to handle a string of zero data as one data, and is further encoded by the Hafman Huffman encoding method.

In reproducing the original image from the compressed image data, first it is decoded by the Hafman Huffman decoding method or the like, to obtain the image data 57. The image data 57 is then subjected to an inverse processing opposite to the normalization processing and to an inverse DCT processing opposite to the forward direction DCT processing, to thereby reproduce the original image information.

FIG. 3C shows tile contents of the forward direction DCT processing shown in FIG. 3B. The image data f is sandwiched between a transposed cosine factor matrix $D^t$ and cosine factor matrix D to obtain a DCT factor F through matrix calculation. The forward direction DCT processing can be developed to and expressed by:

$$F = D^t * f * D = \{(fD)^t D\}^t$$

Namely, the image data f is multiplied by the cosine factor matrix D on the right side of the image data f to frequency-analyze the row direction, the obtained matrix is transposed by interchanging rows and columns, the transposed matrix is multiplied again by the cosine factor matrix D to frequency-analyze the column direction, and the obtained matrix is transposed to obtain tile original orientation of rows and columns. In this manner, the DCT factor F is obtained which represents the results of the frequency analysis of the image information In the row and column directions. Matrix multiplication is required to be executed two times.

FIG. 4A to 4C show transformation factor matrices to be used by tile Forward and inverse DCT transformation operations for a sub-frame or block size of 8*8. FIG. 4A shows a cosine factor for matrix D and transposed cosine factor matrix $D^t$.

In performing tile forward direction DCT by the above-described equation, the cosine factor matrix D is stored in a memory, and an input signal Is multiplied by the cosine factor matrix D (products-summing calculation). In the inverse DCT, the image information F can be reproduced From the DCT factor F by the following equation:

$$f = D F D^t = (F^t * D^t * D^t) = \{(FDt)^t * Dt\}^t.$$

Namely, in the inverse DCT, the DCT factor F is multiplied by tile transposed cosine factor matrix $D^t$ on the right side of the DCT factor F, and the obtained result is transposed by interchanging rows and columns. The transposed matrix is again multiplied by tile transposed cosine factor matrix $D^t$, and tile obtained result is transposed to obtain the original orientation of rows and columns.

Assuming that the image data f and cosine factor matrix D are both an 8*8 matrix, an 8*8 matrix multiplication is performed. In the Forward and inverse DCT processing of such an 8*8 matrix multiplication, it is necessary to use eight multipliers.

When carefully observing tile cosine factor matrix D, it can be seen that in each column the first to fourth rows are symmetrical with the fifth to eighth rows, neglecting the signs of each element. More in particular, there is a relationship of $D_0 = \pm D_7$, $D_1 = \pm D_6$, $D_2 = \pm D_5$, and $D_3 = \pm D_4$, where $D_0$ to $D_7$ are the elements of a column of the cosine factor matrix D. The sign of each element is identified by a column, taking a plus sign for an odd column and a minus sign for an even column.

Multiplications for the same element factor can be used in common, allowing Four multiplication calculations to be executed by one products-summing calculation. DCT with a high speed algorithm positively using such matrix element symmetry has been proposed.

The number of element factors used in the products-summing calculation of DCT is determined by the block or sub-frame size, and is a fixed number.

As one method of matrix multiplication, there is known a distributed arithmetic (DA) algorithm. Consider a matrix multiplication $Y = A * X$ where X has m bits. A matrix multiplication for one column can be expressed by the following equation (i):

$$\begin{bmatrix} Y_0 \\ Y_1 \\ \vdots \\ Y_n \end{bmatrix} \begin{bmatrix} A_{00} & A_{01} & \cdots & A_{0n} \\ A_{10} & A_{11} & \cdots & A_{1n} \\ \vdots & & & \vdots \\ A_{n0} & A_{n1} & \cdots & A_{nn} \end{bmatrix} \begin{bmatrix} X_0 \\ X_1 \\ \vdots \\ X_n \end{bmatrix} \rightarrow Y_i = A_{ij}X_i \quad \text{(i)}$$

where $X = -x^{(m-1)}*2^{m-1} = \Sigma_M X^{(M)}*2^M$. Therefore, the EQUATION (i) can be expressed by the following equation (ii)

$$\begin{aligned} Y_i &= \Sigma_j A_{ij} X_j \\ &= \Sigma_j(-A_{ij}x_j^{(m-1)}) * 2^{(m-1)} + \Sigma_M A_{ij}x_j^{(M)}*2^M) \end{aligned} \quad \text{(ii)}$$

where $x^{(M)}$ is an M-th bit of X and takes a value "0" or "1". The equation (ii) can be expressed by:

$$Y_i = -(\Sigma_j A_{ij}x_j^{(m-1)}*2^{m-1} + \Sigma_m(\Sigma_j A_{ij}x_j^{(M)}) *2^M$$

where the first term of the right side represents a sign bit, and the second term represents products-summing for bits of X, $x_j^{(M)}$ takes a value "0" or "1". If A is an n*n matrix, the products are summed j times where j=0 to (n−1).

By using look-up tables which store the contents in the parentheses () in the equation (ii) by using $x_j$ as a parameter, the matrix multiplication $Y_i$ can be calculated by a shift operation depending upon the bit position and by additional and subtraction operations, The scale of the hardware configuration for DCT calculation becomes large if multiplier are used in speeding up the operation speed. It is therefore desired not to use multipliers as less as possible. In this connection, the DA algorithm is suitable for a multiplication method without using multipliers.

FIGS. 5A to 5C show an example of a two-dimensional DCT calculation circuit using a DA algorithm. FIG. 5A is a schematic diagram showing the outline structure of the DCT calculation circuit, FIG. 5B shows the structure of a one-dimensional (1-D) processing unit, and FIG. 5C shows the structure of a DA products-summing calculation block of the one-dimensional processing unit.

In. FIG. 5A, input data is supplied to a 1-D DCT processing unit 61 to DCT-transform tile input data by using look-up tables. An output of the 1-D processing unit 61 is supplied to a shift/round circuit 62. The shift-/round circuit 62 aligns the digit position and rounds off a signal having an increased number of bits caused by the DCT process to thereby have a predetermined number of bits.

An output of the shift/round circuit 62 is supplied to a transpose RAM 63 whereat rows and columns are interchanged. The transposed signal is supplied to a 1-D DCT processing unit 64 to frequency-analyze in other direction, the result being supplied to a shift/round circuit 65. The shift/round circuit 65 again aligns the digit position and round off a signal outputted from the 1-D DCT processing unit 64 to thereby have the predetermined number of bits, the result being supplied as output data.

FIG. 5B is a schematic diagram showing the structure of the 1-D DCT processing unit 61, 64 shown in FIG. 5A. In the 1-D DCT processing unit, input data is supplied to a pre-processing circuit 66 to form a combination of proper input signals. Combinations of input signals are supplied to two DA products-summing blocks 67 and 68.

For example, if an image signal is an 8*8 sub-frame or block, eight input data signals are supplied to the pre-processing circuit 66 which supplies four signals to the DA products-summing block 67 and the other four signals to the DA products-summing block 68.

Use of the two separate DA products-summing blocks is desirable in that the size of a look-up table is not made too large and the symmetry of a DCT matrix can be positively used. The output signals of the DA products-summing blocks 67 and 68 are supplied to a post-processing circuit 69 to rearrange the signals to form new set of signals. A set of output signals of the post-processing circuit 69 is supplied to the shift/round circuit 62, 65.

FIG. 6 shows the fundamental structure of such a DCT processing circuit using look-up tables. N input signals are supplied as addresses to an element factor ROM 81 which stores DCT look-up tables, and a products-summing calculation is performed using the look-up tables. If the input $x_i$ is a sign bit, the sign of the output signal of the look-up table 81 is inverted by a signal Ts. The sign-inverted signal is supplied to an adder 83 to be added to an output of a coefficient circuit 84. The adder 83 delivers an output signal $Y_i$.

The output signal $Y_i$ is halved by the coefficient circuit, 84 and fed back to the adder 83.

Next, the input of one-bit higher is supplied to the look-up table 81 and processed in a similar manner as above. The output of the look-up table 81 is supplied to the adder 83 to be added to the previous calculation result with its digits being aligned by the coefficient circuit 84, to thereby generate the output signal $Y_i$. The coefficient circuit 84 is used for aligning bit positions.

If an input signal has 15 bits, it takes generally 15 cycles to process the input signal. In order to process an 8*8 block in real time, it is necessary for the calculation to be completed within 8 cycles, even if pipelining technique is used. It is possible to complete the calculation within 8 cycles by using 2 bits of the input signal at a time and doubling the capacity of look-up tables.

As seen from the DCT matrices shown in FIG. 4A, the first to fourth rows of each column of the cosine factor matrix D are symmetrical with the fifth to eighth rows of the same column. The same look-up table can therefore be used both for the first to Fourth rows and for the fifth to eighth rows. It is efficient to divide eight input signals into two signal groups each having four signals, and to use the same look-up table for each group.

FIG. 7 shows the structure of a DCT processing circuit for processing an 8*8 block wherein input signals are divided into two groups each having four signals, and two bits of each signal are supplied at a time to the DCT processing circuit.

An element factor ROM 81a and element factor ROM 81b each have look-up tables of the same contents. A set of upper bits and a set of lower bits, respectively of the four input signals, are supplied to look-up tables. A lower bit is supplies to a look-up table 81b, and the output of the table 81b is halved by a coefficient circuit 86 and added to an output signal of an upper bit look-up table 81a by an adder 83.

If the input is a sign bit, the sign of the input signal is inverted in response to a signal Ts and added to an output of the coefficient circuit 86 to generate an output signal $Y_1$. This output signal $Y_j$ is fed back to the adder 83 via a coefficient circuit 87 which divides the output signal $Y_1$ by 4 and feeds it back to the adder 83. This division by 4 is necessary because of the calculation of two bits at a time, so that the preceding calculation result will not be multiplied by 4 at the current calculation.

FIG. 5C shows tire structure of the DA products-summing calculation block to be used by the one-dimensional DCT processing unit shown in FIG. 5B. Each DA products-summing calculation block is inputted with four groups of input signals, each of two bits. Two bits of each of four input signals are divided into an upper bit and a lower bit. The lower bit is supplied to a lower bit look-up table 71a or 72a, and the upper bit is supplied to an upper bit look-up table 71b or 72b.

Namely, the lower bit look-up tables 71a and 72a and the upper bit look-up tables 71b and 72b are supplied with lower and upper bits of the same combination of input signal, and performs the same transformation.

An output signal from the lower bit look-up table 71a, 72a is halved by a coefficient circuit 73, and supplied to an adder 74. An output signal from the upper bit look-up table 71b, 72b is directly supplied to the adder 74.

The coefficient circuit 73 operates to align the digit position of the data read from the tables by using the upper and lower bits, and the adder 74 adds the data. An output signal from the adder 74 is supplied to an accumulator 75 to calculate a products-sum. The accumulator 75 includes an adder 74, a register 78, and a shifter 79. The preceding output signal is bit-shifted by the shifter 79 and fed back to the adder 77.

The adder 77 adds the preceding output signal to the current output signal, and the result is stored in the register 78. For example, in the calculation starting from the lowest bit, the shifter 79 divides the output signal by 4 to align the number of bits with that of the preceding calculation. In the calculation starting from the highest bit, the shifter 79 multiplies the output signal by 4 to align the number of bits with that of the preceding calculation.

The above-described manner, a DCT calculation is performed by using the DA products-summing blocks shown in FIG. 5C.

In an inverse DCT processing, the transposed matrix $D^t$ shown in FIG. 4A is used. $D^t$ is not symmetric as the transformation matrix D. However, it is symmetric with respect to odd and even columns, 1st column and 8th column, 2nd column and 7th column, 3rd column and 6 th column, and 4th column and 5th column.

In the inverse DCT processing, therefore, the scale of a look-up table can be reduced like the forward DCT processing, by separating the transformation matrix into matrices for odd, and even numbers.

Tables 1 to 8 show the contents of look-up tables shown in FIG. 5C.

The forward DCT look-up tables shown in Tables 1 to 8 correspond to the first to eighth columns of the transformation matrix, and the input signals x1 to x4 correspond to the first to fourth rows of the transformation matrix.

In the inverse DCT look-up tables shown in Tables 1 to 8, No. 0 of Table 1 and No. 1 of Table 2 correspond to the first and eighth columns, No. 0 corresponds to the odd row and No. 1 corresponds to the even row. Similarly, No. 2 of Table 3 and No. 3 of Table 4 correspond to the second and seventh columns. No. 4 of Table 5 and No. 5 of Table 6 correspond to the third and sixth columns. No. 6 of Table 7 and No. 7 of Table 8 correspond to the fourth and fifth columns.

Numbers of the forward and inverse DCT look-up tables shown in Tables 1 to 8 are the same for Nos. 1, 3, 5, and 7. Therefore, a single look-up table can be shared.

Each of the eight DA products-summing blocks shown in FIG. 5B uses four look-up tables shown in FIG. 5C. Therefore, the one dimensional DCT processing is carried out by using 4*8=32 look-up tables, It is necessary to use 32*2=64 look-up tables for the two-dimensional DCT processing.

However, some look-up tables can be shared for the forward and inverse DCT processing as seen from Tables 1 to 8, so that the number of necessary look-up tables becomes 48.

Furthermore, the look-up table shown in FIG. 1 has high symmetry which allows a simpler circuit configuration, FIGS 8A and 8B show an example of a simplified DCT processing circuit using the symmetry of a look-up table. As shown in FIG. 8A, in the forward DCT look-up table No. 0 for example, if each number is subtracted by 8192, the upper half and lower half of Table become symmetrical.

Namely, the contents of the look-up table can be halved if bit x4 is used to exclusive-OR other bits and the signs thereof are inverted.

FIG. 8B shows the structure of a DA products-summing calculation block using such symmetry. Look-up tables 88a and 88b have half the contents of the look-up tables 81a and 81b shown in FIG. 7, and are inputted with three input signals generated by exclusive or gates.

The signal x4 is supplied via an exclusive OR gate to a sign inverter 82. The other structure is the same as that show in FIG. 7.

As described above, for simplifying the structure of the DCT processing unit, it is necessary to simplify the calculation by using the symmetry or the cosine factor matrix and transposed cosine factor matrix.

It is therefore necessary to divide input signals into groups each using the same transformation factor. In order to divide a plurality of input signals into a plurality of desired combinations of input signals, butterfly circuits in combinations of adders and subtracters are used.

FIG. 2 shows an example of a two-dimensional DCT processing unit having ROM tables which store matrix element factor for the DCT processing. Input signals are supplied to a shift register 121 which supplies in parallel the input signals to butterfly circuit 122 and to a selector 123. The butterfly circuit 122 divides a plurality of input signals into a plurality of desired input signal groups and outputs the latter to the selector 123.

The selector 123 selects one of the input signals in response to a forward/inverse select signal indicating whether the DCT processing unit performs a forward DCT processing or inverse DCT processing. The input signal selected by the selector 123 is supplied to a calculation ROM unit 124 to perform a matrix calculation.

An output signal from the calculation ROM unit 124 is supplied parallel to a selector 126 and to a butterfly circuit 125. The butterfly circuit 125 divides a plurality of input signals into a plurality of desired input signal groups, and outputs the latter to a selector 126.

The selector 126 selects one of the input signals in response to a forward/inverse select signal indicating whether the DCT processing unit performs a forward DCT processing or inverse DCT processing. The input signal selected by the selector 126 is supplied to an accumulator 127 which sums up the sequentially-supplied calculation results for respective bits.

An output signal from the accumulator 127 is supplied via a shift register 128 to a transposing circuit 130 to interchange rows and columns. Signals transposed by the transposing circuit 130 are supplied to another one-dimensional processing unit having the same structure described above.

Specifically, the other one-dimensional processing unit includes a shift register 131, butterfly circuit 132, selector 133, calculation ROM 134, butterfly circuit 135, selector 136, accumulator 137, and shift register 138. These elements perform similar operations to those of the corresponding elements 121 to 128, and the calculation result is outputted.

As described above, four butterfly circuits are used for the two-dimensional DCT processing by positively using the symmetry of the cosine factor matrix and transposed cosine factor matrix.

A DCT processing unit with look-up tables can execute the DCT processing without using multipliers as described above.

However, if the capacity of a look-up table is large, the chip area of a ROM occupied by the look-up table becomes large, increasing the chip size and power consumption.

SUMMARY OF THE INVENTION

It is an object of the present invention to provide a discrete cosine transformation apparatus of a simple structure.

It is another object of the present invention to provide a discrete cosine transformation apparatus capable of reducing the size of a chip and lowering power consumption.

According to one aspect of the present invention, there is provided a discrete cosine transformation processor which comprises: a first one-dimensional discrete cosine transformation circuit having a one-dimensional discrete cosine processing circuit, a pre-processing circuit connected to the input of the one-dimensional discrete cosine processing circuit, and a post-processing circuit connected to the output of the one-dimensional discrete cosine processing circuit; a second one-dimensional cosine transformation circuit having a one-dimensional discrete cosine processing circuit, a pre-processing circuit connected to the input of the one-dimensional discrete cosine processing circuit, and a post-processing circuit connected to the output of the one-dimensional discrete cosine processing circuit, the pre-processing circuit of the first one-dimensional discrete cosine transformation circuit and the post-processing circuit of the second one-dimensional discrete cosine transformation circuit includes a shared first butterfly circuit, and the post-processing circuit of the first one-dimensional discrete cosine transformation circuit and the pre-processing circuit of the second one-dimensional discrete cosine transformation circuit includes a shared second butterfly circuit; and a transpose circuit.

For the forward DCT calculation, a desired combination of input signals to the DCT processing circuit is required to be generated by a butterfly circuit. An output signal of the DCT processing circuit is not necessary to be sent to a butterfly circuit, but can be outputted directly to the output buffer. On the contrary, for the inverse DCT calculation, an input signal to the DCT processing circuit is not necessary to be sent to the butterfly circuit, but an output signal of the DCT processing circuit is required to be sent to the butterfly circuit.

In performing the two-dimensional DCT calculation, two of four butterfly circuits are used and the other two butterfly circuits are not used.

Therefore, in performing the two-dimensional DCT calculation, it is sufficient if two one-dimensional DCT processing circuits and two butterfly circuits are used.

In the two-dimensional discrete cosine transformation, the number of butterfly circuits can be reduced by commonly using the butterfly circuits.

According to another aspect of the present invention, there is provided a discrete cosine transformation processor for sampling two bits of each element for input data having a plurality elements, and performing a forward/inverse cosine transformation (DCT) by using hook-up tables, each look-up table being used for two bits of each of two elements of a forward DCT matrix and an inverse DCT matrix, Each look-up table is used for two bits of each of two elements of a DCT matrix. It is therefore possible to extend the shared portion of look-up tables for the forward and inverse DCT processing, reducing a semiconductor chip size of the discrete cosine transformation processor and lowering power consumption.

BRIEF DESCRIPTION OF THE DRAWINGS

FIG. 3A to 3C are schematic diagrams explaining a conventional image data compression technique using DCT.

FIG. 4A to 4C arc schematic diagrams explaining DCT processing matrices.

FIG. 10 is a block diagram showing the structure of a ROM accumulator of the DCT processing apparatus.

FIG. 11 is a block diagram showing another structure of the ROM accumulator of the DCT processing apparatus.

FIG. 15A and 15B show the fundamental structure of a discrete cosine transformation unit according to an embodiment of the present invention, FIG. 15A is a circuit block diagram, FIG. 15B is a conceptual diagram showing the calculation.

DETAILED DESCRIPTION OF THE PREFERRED EMBODIMENTS

Figure 1:
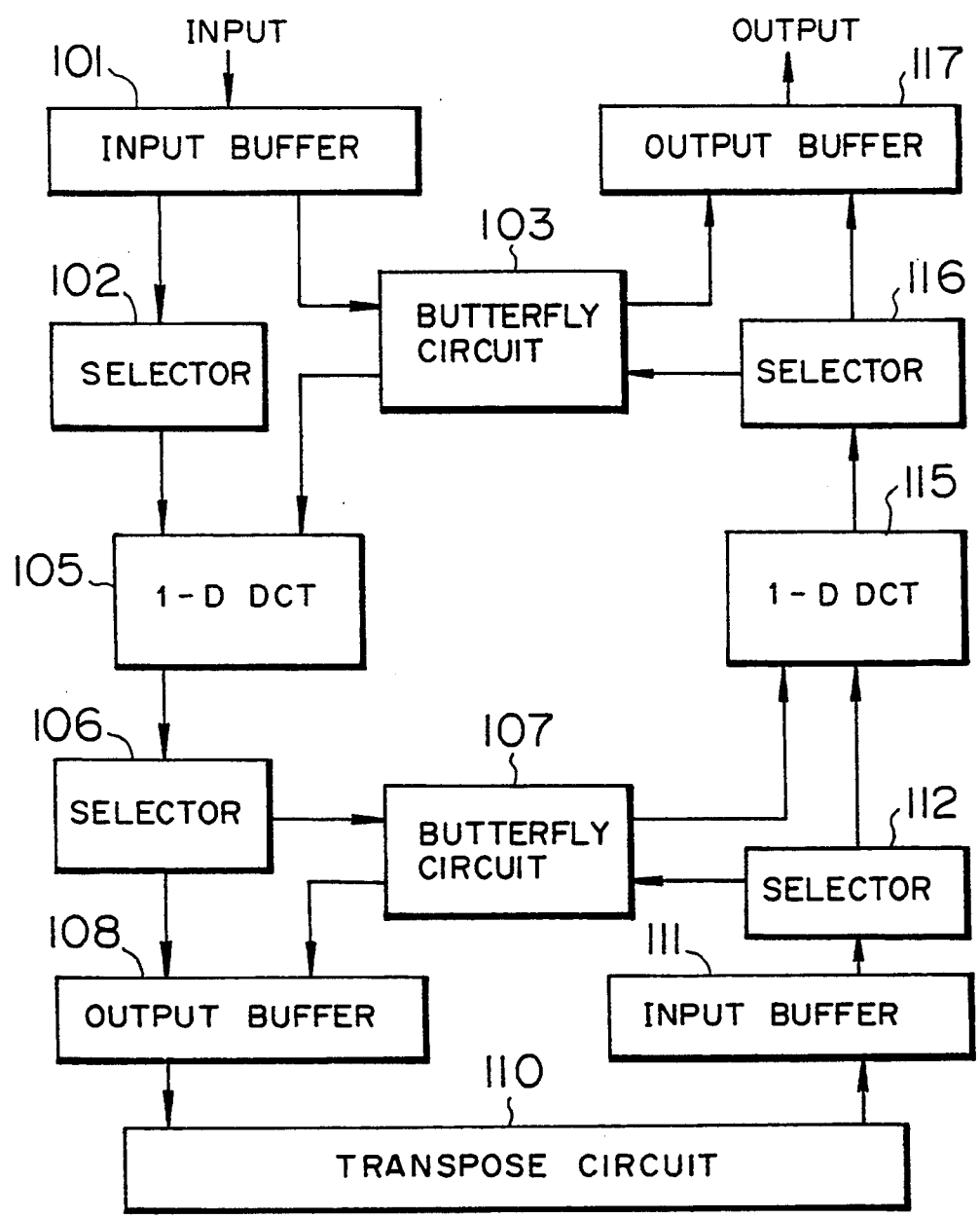
FIG. 1 is a block diagram showing an embodiment of a DCT processing apparatus according to the present invention.
Figure 2:
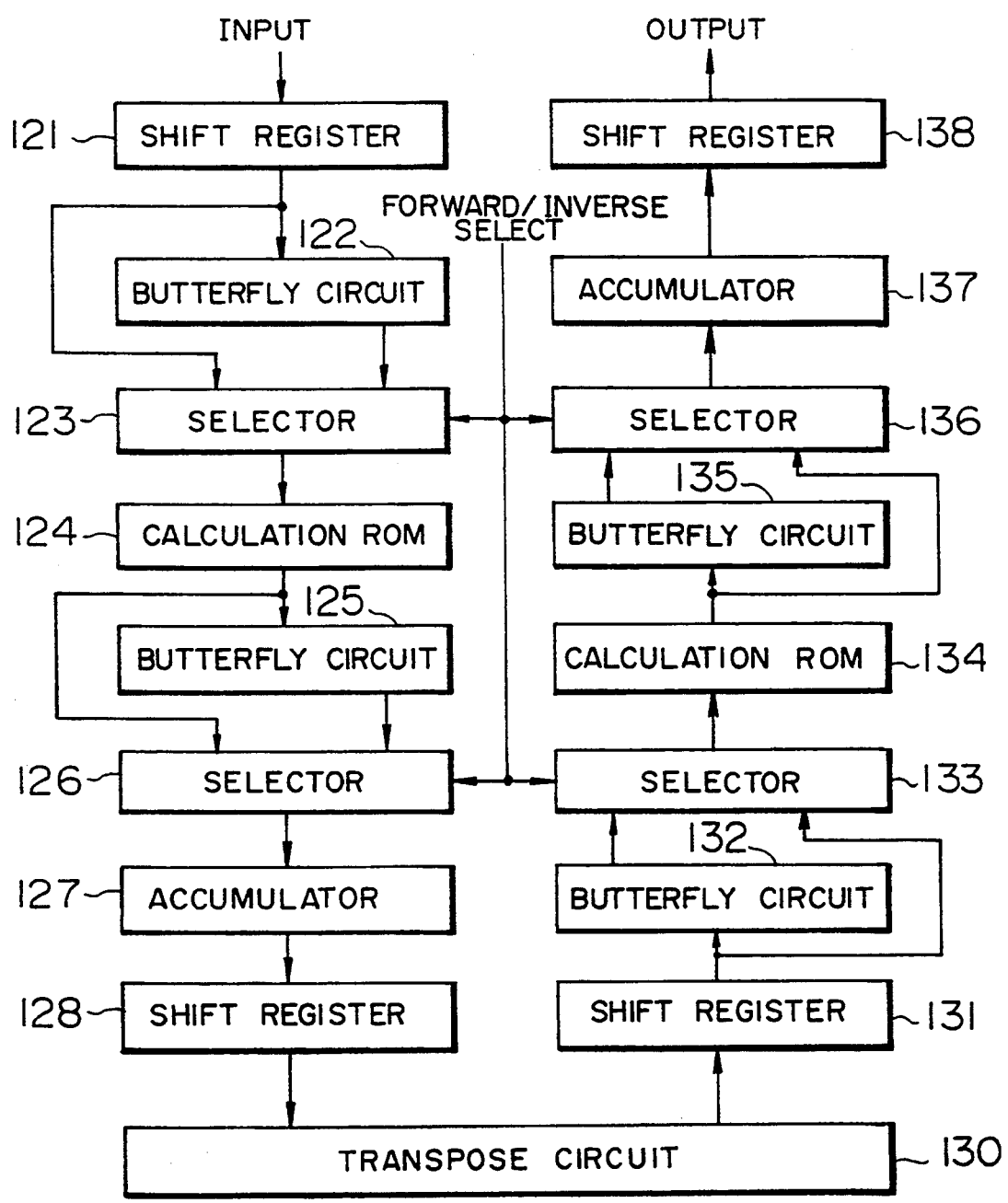
FIG. 2 is a block diagram explaining a conventional technique.

FIG. 1 shows the structure of a two-dimensional DCT processing apparatus according to an embodiment of the present invention. A plurality of input signals are supplied via an input buffer 101 to a selector 102, The selector 102 supplies the input signals directly to a one-dimensional DCT processing circuit 105 or to a butterfly circuit 103. An output; signal from the butterfly circuit, 103 is supplied to the one-dimensional DCT processing circuit 105, Namely, the selector 102 can determine either to supply the input signals directly to the one-dimensional DCT processing circuit 105 or to supply them via the butterfly circuit 103.

An output signal of the one-dimensional DCT processing circuit 103 is supplied to a selector 106, The selector 106 supplies its input signal directly to an output buffer 108 or to a butterfly circuit 107. An output signal of the buffer circuit 107 is supplied to the output buffer 108, A transpose circuit 110 transposes its input signal by interchanging rows and columns of a matrix. A matrix signal with interchanged rows and columns is supplied from the transpose circuit 110 to an input buffer 110 and to a selector 112.

The selector 112 supplies its input signal directly to a one-dimensional DCT processing circuit 115 or to the butterfly circuit 107. An output signal from the butterfly circuit 107 is supplied to the one-dimensional DCT processing circuit 115.

An output signal of the one-dimensional DCT processing circuit 115 is supplied to a selector 116. The selector 116 supplies its input signal directly to an output buffer 117 or to the butterfly circuit 103. An output signal of the butterfly circuit 103 is supplied to the output buffer 117. The output buffer 117 delivers a two-dimensional DCT-processed output signal.

In the case of the forward DCT processing, the selector 102 supplies the input signals to the butterfly circuit 103, and the selector 106 supplies its input signal directly to the output buffer 108. On the other hand, the selector 112 supplies its input signal to the butterfly circuit 107, and the selector 116 supplies its input signal directly to the output buffer 117.

In the above-described manner, the butterfly circuit 103 generates an input signal to the first one-dimensional DCT processing circuit 105, and the butterfly circuit generates an input signal to the second one-dimensional butterfly circuit 115.

In the case of the inverse DCT processing, the selector 102 supplies the input signals directly to the one-dimensional DCT processing circuit 105, and the selector 106 supplies its input signal to the butterfly circuit 107. On the other hand, the selector 112 supplies its input signal directly to the one-dimensional DCT processing circuit 115, and the selector 116 supplies its input signal to the butterfly circuit 103.

In the above-described manner, the butterfly circuit 107 performs addition/subtraction of the output signal from the first one-dimensional DCT processing circuit 105, and the butterfly circuit 103 performs addition/subtraction of the output signal from the second one-dimensional DCT processing circuit 115.

If is therefore possible to configure the two-dimensional DCT processing apparatus by using two butterfly circuits 103 and 107. The one-dimensional DCT processing circuits 105 and 115 may be circuits for performing a matrix multiplication, or circuits using ROM tables.

Figure 9:
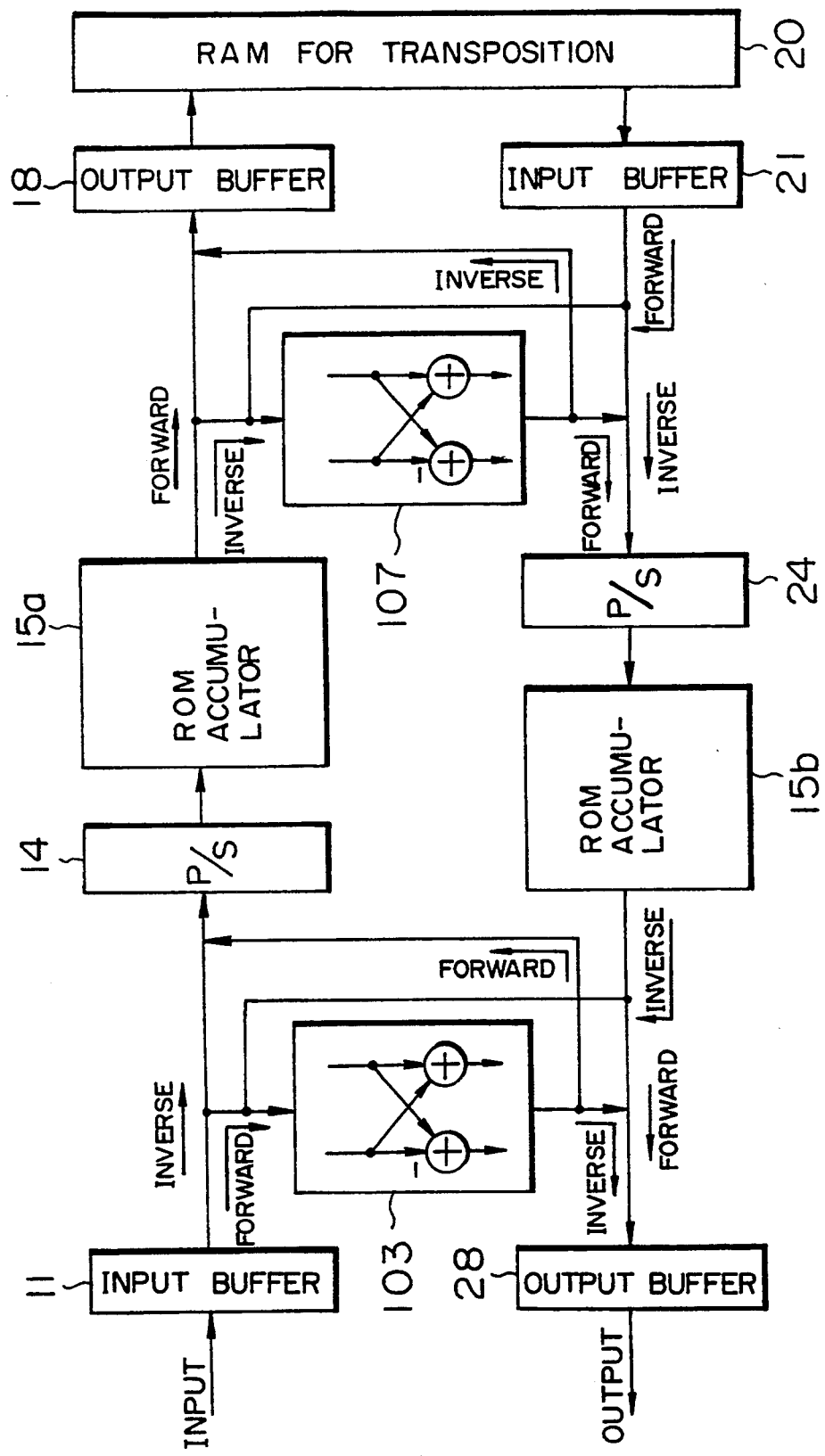
FIG. 9 is a block diagram showing the main part of a DCT processing apparatus according to an embodiment of the present invention.

FIG. 9 shows the structure of a two-dimensional DCT processing apparatus having ROM tables which store the preliminarily calculated results of the DCT processing.

Input signals are supplied from an input buffer 11 directly, or via a butterfly circuit 103, to a parallel/serial converter 14. A serial signal outputted from the parallel/serial converter 14 is supplied to a ROM accumulator. The ROM accumulator 15a performs a products-summing operation for an input signal combination, and outputs the calculation result which is supplied directly or via a butterfly circuit 107 to an output buffer 18 and to a transpose RAM 20.

The transpose RAM 20 transposes an inputted matrix signal by interchanging rows and columns, and outputs a transposed matrix. This transposed output is supplied from an input buffer 21 directly or via the butterfly circuit 107 to a parallel/serial converter 24.

A serial signal converted by the converter 24 is supplied to a ROM accumulator 15b to perform a DCT processing. Like the ROM accumulator 15a, the ROM accumulator 15b performs a products-summing operation for an input signal combination.

An output signal from the ROM accumulator 15b is supplied directly or via the butterfly circuit 103 to the output buffer 28 which delivers a calculation result output signal.

As indicated by the words "forward" and "inverse" in FIG. 9, for the forward DCT processing, the butterfly circuit 103 is used by the first one-dimensional DCT processing, and the butterfly circuit 107 is used for the second one-dimensional DCT processing. Selectors for selecting a signal are omitted in FIG. 9.

For the inverse DCT processing, the butterfly circuit 103 is used by the second one-dimensional DCT processing, and the butterfly circuit 107 is used for the first one-dimensional DCT processing. It is therefore possible to configure the two-dimensional DCT processing apparatus by using two butterfly circuits.

The structure of each circuit portion simplifying the two-dimensional DCT processing apparatus will be described below.

FIG. 10 is a schematic diagram showing the structure of a ROM accumulator 15. With this structure, a plurality of input signals are divided into pairs of two input signals, each pair being assigned a single hook-up table. Look-up tables 1a and 1b are inputted with two bits of each of input signals I1 and I2, and I3 and I4, respectively. The corresponding outputs are supplied to an adder 2.

Since the look-up tables 1a and 1b are used for the input signals of the same bit positions, the bit positions of the output signals are the same. Therefore, the output signals are supplied to the adder 2 without processing them. An output of the adder 2 is supplied to an accumulator 6 to perform a products-summing operation. The accumulator 6 includes an adder 3, register 4, and shifter 5. An output signal of the adder 3 is stored in the register 4. An output signal of the register 4 is fed back to the adder 3 via the shifter 5.

Therefore, the preceding value stored in the register 4 is supplied from the shifter 5 to the adder 3, and added to the new signal.

Similar to the look-up tables $1a$ and $1b$, look-up tables $1c$ and $1d$ are inputted with two bits of each of two input signals I5, I6, and I7 and I8.

in the above manner, each of the look-up tables is inputted with two bits of each input signal, and an input signal combination is properly selected. Therefore, the possibility for using the same look-up table in common both for the forward DCT processing and for the inverse DCT processing, can be increased.

In the following description, a block size of 8*8 is assumed.

For the block size of 8*8, the transformation matrices shown in FIG. 4A are used. Numbers in the matrices are shifted by three bits after the two-dimensional DCT processing was executed.

As described previously, the transformation matrix for the forward DCT processing has the symmetrical structure relative to the upper and lower halves of each column. Therefore, the DCT processing can be performed by using four input signals for each column.

The transformation matrix $D^t$ for the inverse DCT processing has rows and columns interchanged from those of the transformation matrix D. The symmetry of D is not present in $D^t$.

However, the matrix $D^t$ is also symmetric in nature. Consider, for example, the first column of $D^t$. As shown on the left side of FIG. 4B, numbers of even rows are 5681, 4816, 3218, and 1130 which are the same as those at the upper half of the second column of the transformation matrix D for the forward DCT processing. As shown in FIG. 4A, numbers of even rows of $D^t$ are $-5681$, $-4816$, $-3218$, and $-1130$ whose absolute values are the same as those of even rows of the first column, with only their signs being inverted.

The upper and lower halves of the second column of the forward DCT matrix D are symmetrical as shown in FIG. 4A, and are also symmetrical with the even rows of the first and eighth columns of the inverse DCT matrix $D^t$. Using such symmetry, part of a look-up table can be used in common.

In addition to the symmetry of the second column of the forward DCT matrix D and the first and eighth columns of the inverse DCT matrix $D^t$, similar symmetries are present between the fourth column of D and the second and seventh columns of $D^t$, between the sixth column of D and the third and sixth columns of $D^t$, and between the eighth column of D and the fourth and fifth columns of $D^t$. This relationship is shown in FIG. 4B.

The area same as D can also be found at odd rows of $D^t$. For example, consider the first column of $D^t$. Numbers of odd rows are 4096, 5352, 4096, and 2217 as shown in FIG. 4C. Two numbers 4096 and 4096 are the same as those of the first and third rows of the first column of D.

Numbers of third and seventh odd rows of the second column for $D^t$ are the same as those of second and fourth rows of the third column of D. It can be seen that half the numbers of odd rows of $D^t$ are the same as those of D.

As seen from FIGS. 4B and 4C, the same numbers of the inverse DCT matrix $D^t$ and forward DCT matrix D can be found easily by separating the numbers of $D^t$ into odd and even rows and assigning new row numbers.

Combinations of two input signals are therefore determined based upon a combination of first and third rows of each column and a combination of second and fourth rows of each column, respectively, of the forward DCT matrix D, and upon a combination of first and third rows of odd rows, a combination of second and forth rows of odd rows, a combination of first and third rows of even rows, and a combination of second and fourth rows of even rows, respectively of the inverse DCT matrix $D^t$. Tables 9 to 16 show the contents of look-up tables for DCT using two bits of each of two paired signals.

In Tables 9 to 16, the forward DCT look-up tables No. 0 to No. 7 correspond to the first to eighth columns of the matrix D. Of the inverse DCT look-up tables, No. 0 and No. 1 correspond to odd and even rows of the first column of $D^t$ Similarity, No. 2 and No. 3 correspond to odd and even rows of the second column of $D^t$. No. 4 and No. 5 correspond to odd and even rows of the third column of $D^t$. No. 6 and No. 7 correspond to odd and even rows of the fourth column of $D^t$.

In Tables 9 to 16, different numbers between the forward and inverse DCT look-up tables are only at the second and fourth rows of No. 0 , at the first and third rows of No. 2, at the second and fourth rows of No. 4, and at the first and third rows of No. 6. Therefore, these look-up tables can be configured by 2*8+4=20 ROMs. The two dimensional DCT processing apparatus can be configured using 20*2=40 ROMs.

A Further observation of the contents of the look-up tables provides the following fact. Namely, half the numbers encircled by solid lines, i.e., the forward DCT look-up tables No. 0 and No. 4 and the inverse DCT look-up tables No. 2 and No. 6, can be calculated through addition/subtraction for the two bits of each input signal. This can be achieved by shifting 12 bits. Therefore, without using the look-up tables, these numbers can be obtained by an addition/subtraction circuit and a bit shifter.

With such an arrangement, four ROMs can be subtracted from 20 ROMs, resulting in 16 necessary ROMs. The two-dimensional DCT processing apparatus can thus be configured by using 16*2=32 ROMs.

The ROM accumulator of the DCT processing apparatus using such look-up tables is shown in FIG. 11. Element factor ROMs $1a$ and $1b$ have look-up tables each being inputted with two bits of each of two paired signals x1 and x3, and x2 and x4. Since the input signal combination is 4 bits, the contents of the element factor RAM is 16 words.

One of the element, factor ROMs, the ROM $1b$ in FIG. 11, is connected to a circuit having an adder 7, a bit shift coefficient circuit 8, and a selector 9. The circuit of these elements 7, 8, and 9 generates an output signal through addition/subtraction of input signals if different look-up tables are used for the forward and inverse DCT processing. If same look-up table is used for the forward and inverse DCT processing, this operation of this circuit is disabled.

Although the bit shift coefficient circuit 8 is provided on the side of the element factor ROM 16, this circuit may be provided on the side of the element factor ROM 1a depending upon the type of a block. The selector 9 selects either an output of the clement factor ROM 1b or an output of the bit shift coefficient circuit.

An output signal of the element factor ROM 1a and an output signal of the selector 9 are added together by an adder 2. An output signal of the adder 2 is supplied to an adder 3 and outputted therefrom. The output signal of the ROM accumulator is fed back via a coefficient circuit 5 to the adder 3.

This feedback is per formed so as to align bit positions for the products-summing operation, because the bit positions change with consecutive calculation. If the input is a sign bit, the sign of this signal is inverted in response to a signal Ts.

Figure 12:
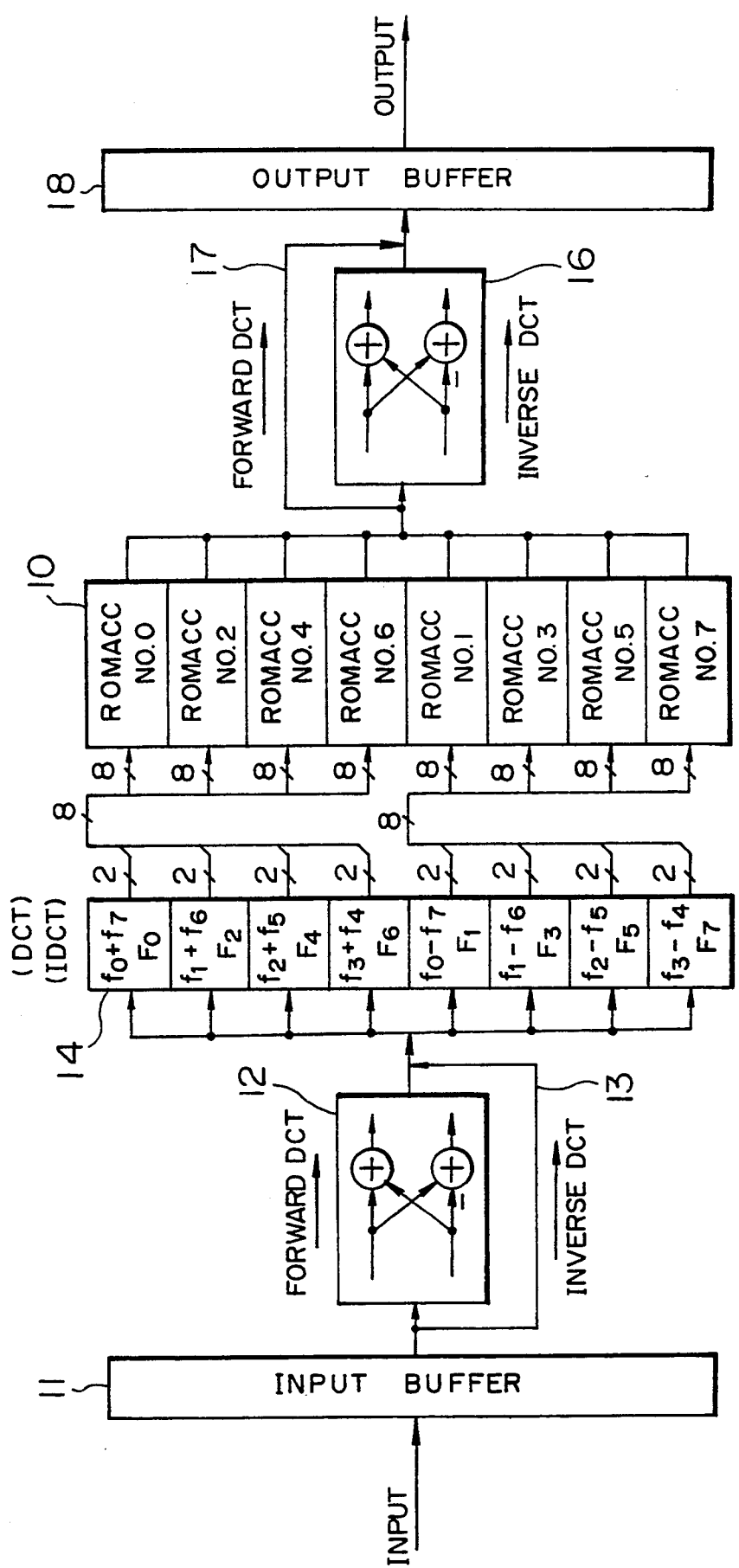
FIG. 12 is a block diagram showing the circuit portion of the one-dimensional calculation of the DCT processing apparatus.

FIG. 12 shows the structure of a one-dimensional DCT processing system.

Input signals are supplied to an input buffer 11, and supplied from the input buffer 11 to a parallel/serial converter 14 via a butterfly circuit 12 or bypass 13.

In the case of the forward DCT, input signals are supplied from the input buffer 11 to the butterfly circuit 12 which generates addition/subtraction of two input signals, i.e., f0+f7, f1+f6, f2+f5, f3+f4, f0−f7, f1−f6, f2 −f5, and f3−f4. These signals are supplied to the parallel/serial converter 14, two bits of each signal being outputted from the converter 14.

In the case of the inverse DCT, input signals are supplied from the input buffer 11 directly to the parallel serial converter 14 via the bypass 13. At the parallel/serial converter 14, odd number input signals f0, f2, f4, and f6 and even number input signals f1, f3, f5, and f7 are separated.

A set of four signals from the parallel/serial converter 14 are combined to form two 8-bit signals. The two 8-bit signals are supplied to a ROM accumulator 10 having a plurality of ROM accumulators shown in FIG. 11. At the ROM accumulator 10, a proper took-up table is selected depending upon the bit position to thereafter deliver an output signal. This output signal is supplied to an output buffer 18 via a butterfly circuit 16 or bypass 17. The output buffer 18 supplies its output signal to a transpose RAM.

For the forward DCT processing, an output signal of the ROM accumulator 10 is supplied via the bypass 17 to the output buffer 18, and for the inverse DCT processing, it is supplied via the butterfly circuit 16 to the output buffer 18. In the above manner, the one-dimensional DCT processing is carried out.

Figure 13:
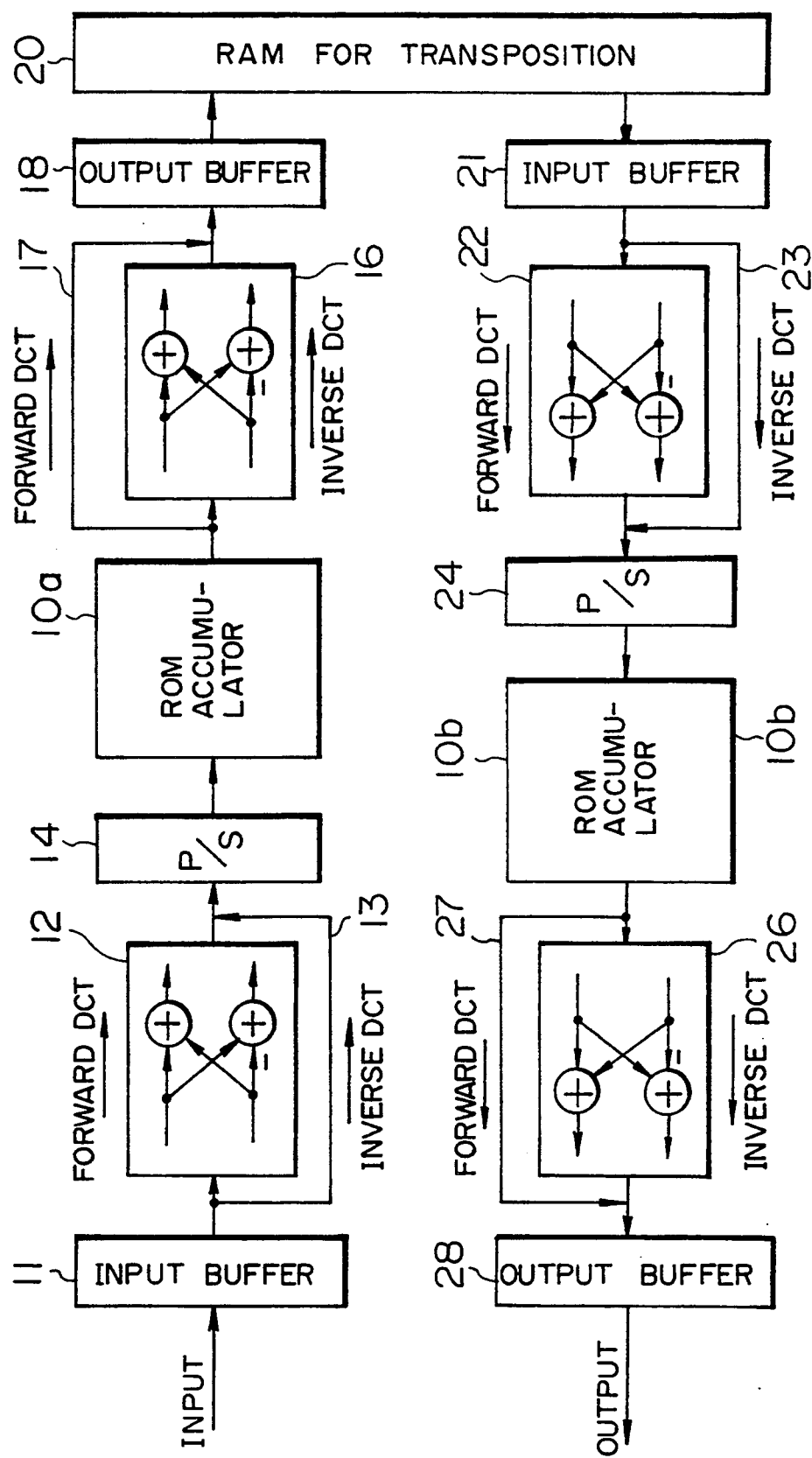
FIG. 13 is a block diagram showing the equivalent circuit of a two-dimensional DCT processing apparatus.

FIG. 13 is an equivalent circuit of the two-dimensional DCT processing.

FIG. 13, an input buffer 11, butterfly circuit 12, bypass 13, parallel/serial converter 14, ROM accumulator 10a, butterfly circuit 16, bypass 17, and output buffer 18 are similar to the corresponding circuit elements shown in FIG. 12.

These circuit elements operate to process the one-dimensional DCT. A one-dimensional DCT-processed signal is transposed by a transpose ROM by interchanging rows and columns. The transposed signal is supplied to an input buffer 21. An input buffer 21, butterfly circuit 22, bypass 23, parallel/serial converter 24, ROM accumulator 10b, butterfly circuit 26, bypass 27, and output buffer 25 constitute another one-dimensional DCT processing circuit, to perform another one-dimensional DCT processing. In this manner, an output signal DCT- processed in two-dimensional directions can be obtained.

Numbers in the look-up tables shown in Tables 9 to 16 can be halved in capacity by using the MSB b2 for an exclusive OR operation of other lower-bits. For example, consider the forward DCT look-up table No. 0. Numbers in this table is subtracted by an average value 12288 so that the upper and lower halves of the tables becomes symmetric. With such an arrangement, the capacity of the look-up table can be halved.

Figure 14:
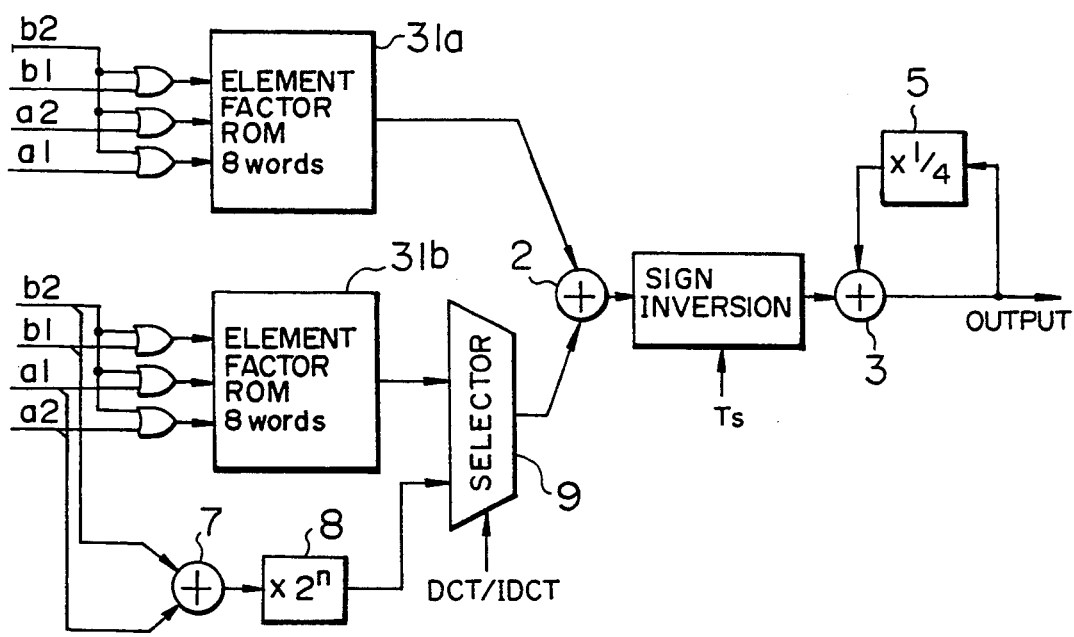
FIG. 14 is a block diagram showing another structure of the ROM accumulator of the DCT processing apparatus.

FIG. 14 shows the structure of a ROM accumulator using such an arrangement. 4-bit input signals b2, b2, a2, and a1 are transformed into three signals by using the signal b2 for and exclusive OR operation of the other signals b1, a2 and a1. The three signals are supplied to element factor ROMs 31a and 31b of the 8-word structure. The other structure is similar to the circuit shown in FIG. 11.

In performing a products-summing calculation of a large number of bits by a forward DCT processor, in many cases a calculation block such as a multiplier does not output a final calculation result at a time, but it outputs the final calculation results after several calculation cycles while sequentially establishing the calculation result starting from the lower (or upper) bit.

Figure 5A:
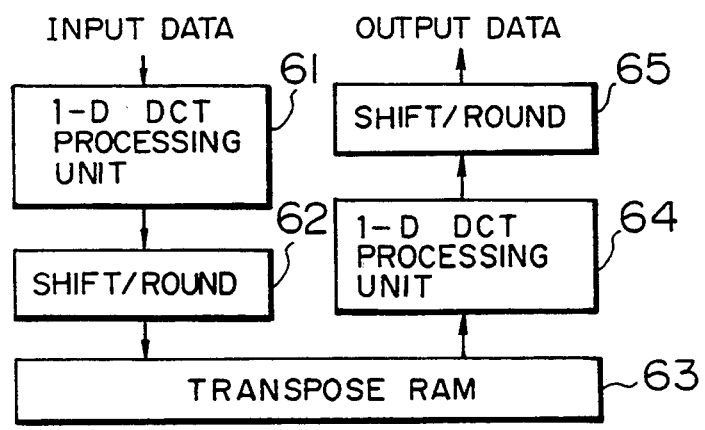
FIG. 5A to 5C arc block diagrams showing the structure of a DCT processing apparatus according to a conventional technique.
Figure 5B:
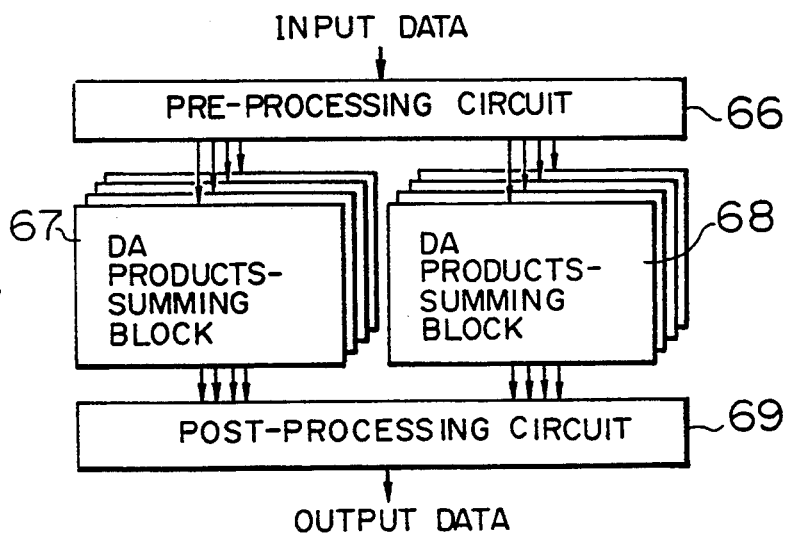
Figure 5C:
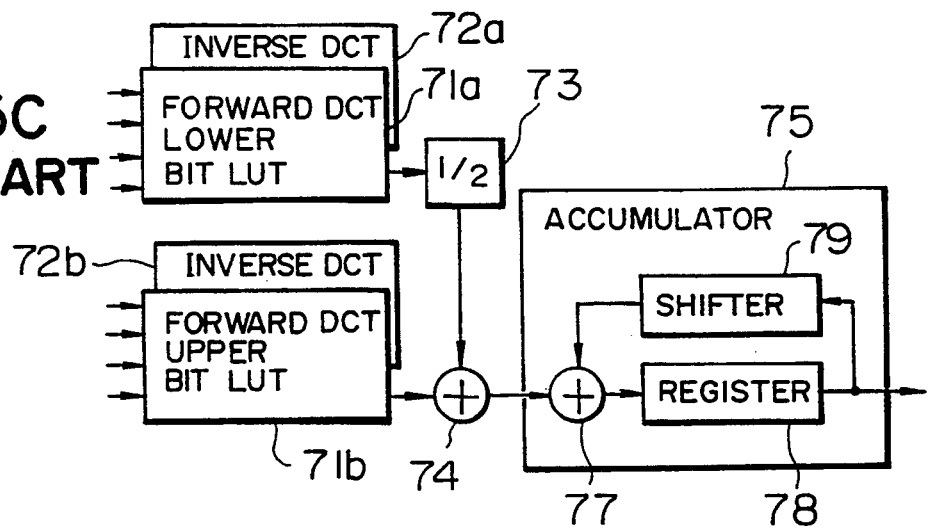
Figure 6:
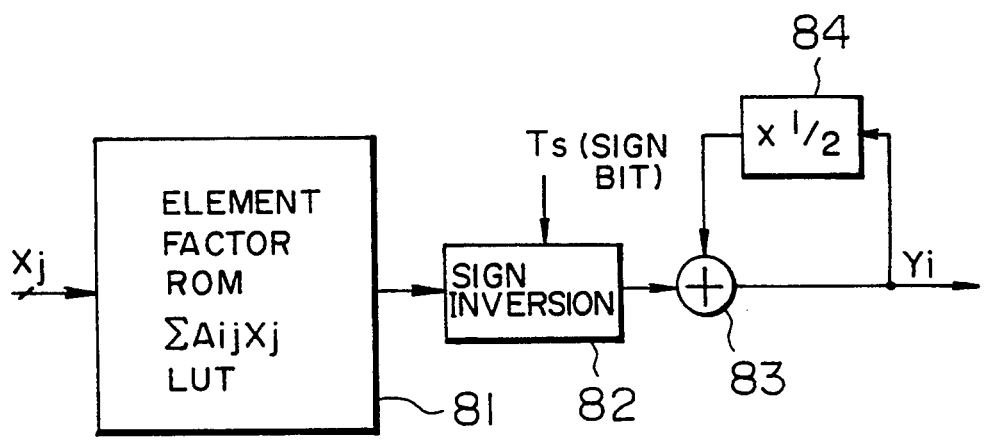
FIG. 6 is a block diagram showing the main part of a DCT processing apparatus according to a conventional technique.
Figure 7:
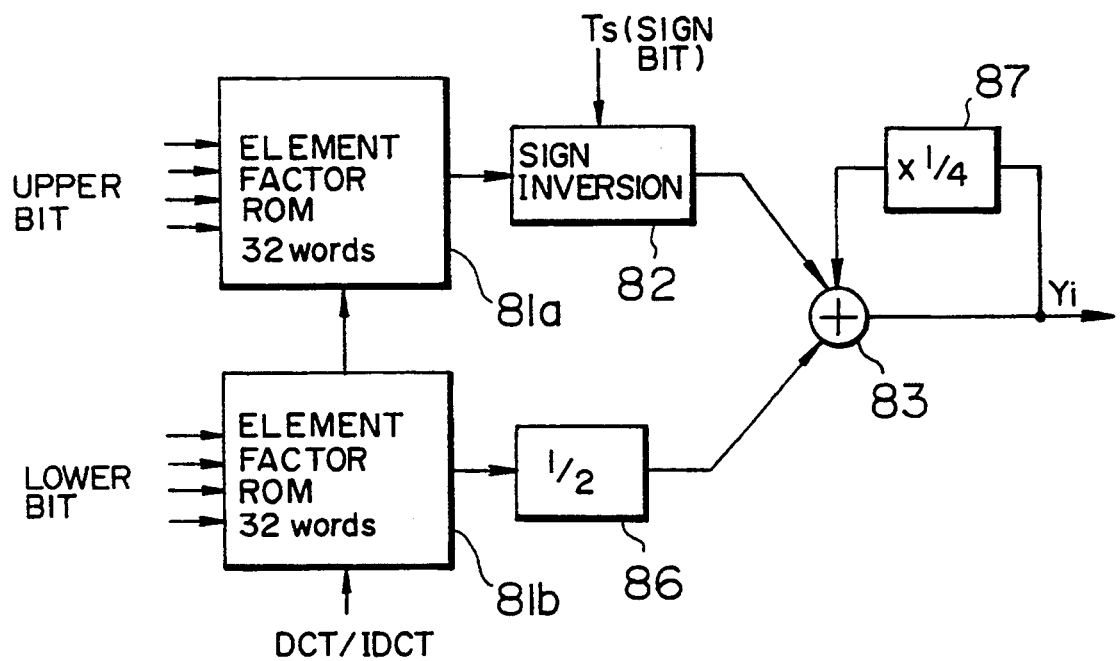
FIG. 7 is a block diagram showing the main part of a DCT processing apparatus according to a conventional technique.
Figures 8A, 8B:
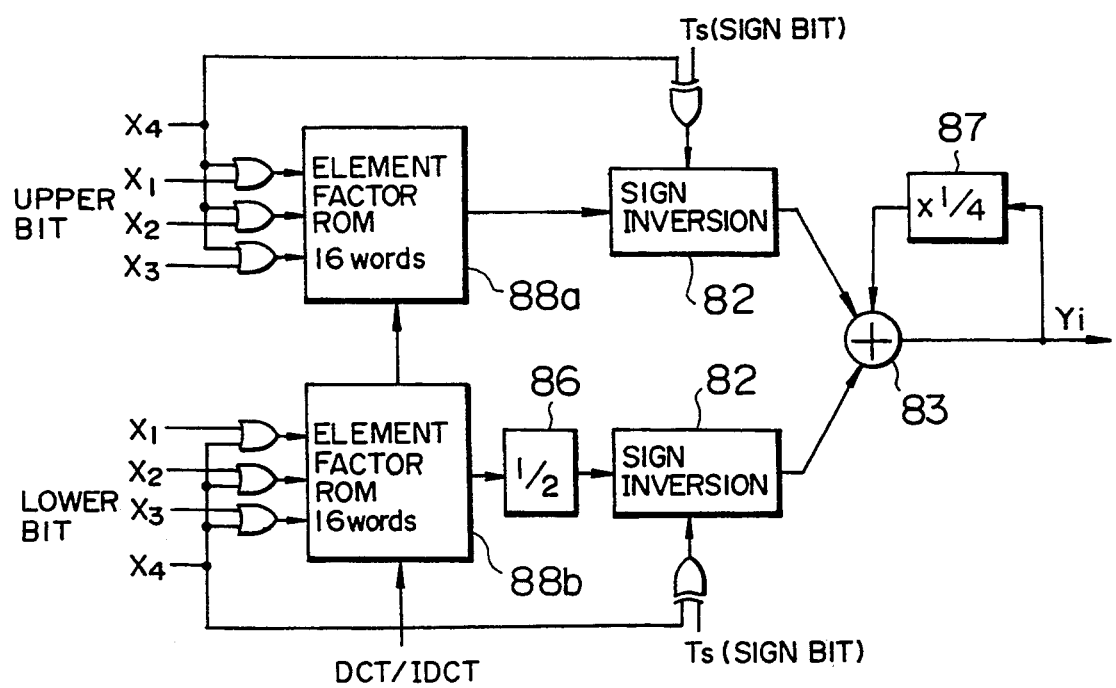
FIG. 8A and 8B are Table and a block diagram showing the main part of a DCT processing apparatus according to a conventional technique.

In the DCT processor shown in FIG. 5C, a calculation for two bits of each paired input signals is performed by each of the two calculation blocks, and the calculation results are accumulated by the accumulator. Therefore, the accumulator is required to store also the final calculation result.

If a calculation for two bits is repeated n times, the final result becomes in the order of 2n bits. Such an accumulator with a large number of bits results in a large amount of hardware and a slow operation speed.

An embodiment of a discrete cosine transformation processor with a products-summing circuit which has a less amount of hardware and a high operation speed, will be described.

A discrete cosine transformation processor for performing a discrete cosine transformation, includes: a calculation block for sequentially performing a calculation for a predetermined bit position of each of a set of input signals;

an adder/subtracter connected to the output of the calculation block;

a shift register for sequentially storing the established portion of an output signal of the adder/subtracter; and a resister for sequentially storing the carry portion used for the addition/subtraction at the next calculation cycle.

The calculation block divides a multi-bit input signal into a predetermined number of bits, sequentially performs a calculation for an input signal at respective bit positions to deliver for an input signals whose bit positions are shifted. Therefore, if the calculation starts from the lower bits, the calculation result is established from the lower bits while sequentially adding/subtracting the output of the calculation block. By sequentially storing the established calculation result for bits in the shift register, the number of bits to be added/subtracted can be made substantially the same small number. When the final calculation result is obtained by the calculation block, the content of the shift register is added to the output of the adder/subtracter while aligning the bit position thereof, to obtain a final calculation result.

FIG. 15A and 15B show the fundamental structure of a DCT processor according to an embodiment of the present invention. FIG. 15A is a circuit block diagram of the embodiment DCT processor, and FIG. 15B is a conceptual diagram showing a change of calculation results.

Referring to FIG. 15A, a calculation block 201 receives a plurality of multi-bit inputs, performs a calculation for a predetermined number of bits, and delivers an output a.

An output at each calculation cycle is supplied to an adder/subtracter 202. The carry portion of an output signal the adder/subtracter 202 is stored in a register 203 and is used for addition/subtraction to and from the next calculation result, and the established portion of the output signal is stored in a shift register 204.

When the calculation block 201 outputs the next calculation result, the carry portion of the preceding calculation result stored in the register 203 and the current calculation, ion result are subjected to addition/subtraction at the adder/subtracter 202. The established portion of the current calculation result is stored in the shift register 204, and the carry portion used for addition/subtraction to and from the next calculation result is stored in the register 203.

Such a calculation is sequentially performed for a predetermined number of bits. When the final calculation is completed, the adder/subtracter 203 outputs an upper-bit calculation result, and the shift register 204 outputs a lower-bit established calculation result. The bit positions of these outputs are aligned to obtain a final calculation result.

The manner of how such a calculation progresses will be described in more detail with reference to FIG. 15B. It is assumed that the calculation starts from the lower bit. At the first calculation, an output a1 for a predetermined number of bits from the LSB is obtained. At the next calculation, an output a2 shifted by the predetermined number of bits is obtained. In this manner, outputs a3, a4, ... are sequentially obtained by the calculation block 201.

Of the output a1 at the first calculation, the predetermined number of bits will not overlap the calculation result at the second calculation, and have been established already. Of the output a1 at the first calculation, the upper bits are subject to addition/subtraction to and from the output a2 at the second calculation. Of the addition/subtraction result output, the predetermined number of bits from the LSB are established at this point.

In the calculations of sequentially adding/subtracting each calculation result, there are calculation results sequentially established. These established result is stored in the shift register 204. Therefore, the number of bits of signals to be added/subtracted by the adder/subtracter 202 can be made substantially the same small number, simplifying the structure of the adder/subtracter 202 and speeding up its operation.

Figure 16:
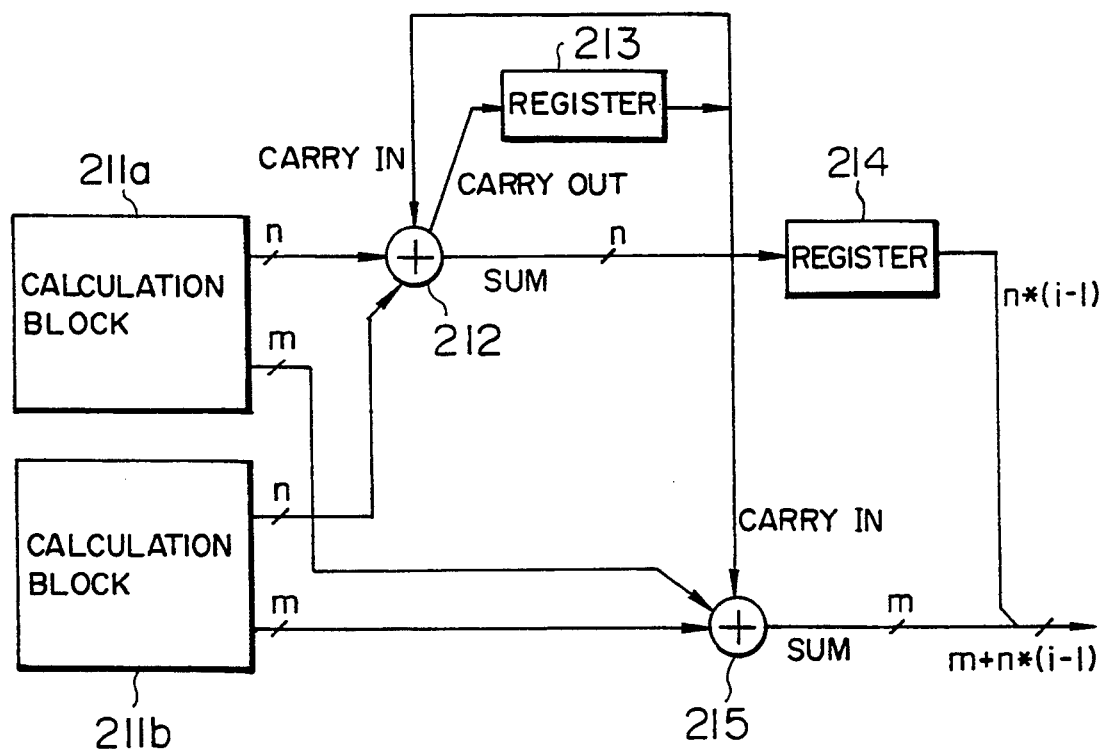
FIGS. 16 is a block diagram showing a DCT processing circuit according to an embodiment of the present invention.

FIG. 16 is a circuit block diagram of a products-summing circuit of a DCT processor according to another embodiment of the present invention.

Each calculation block 211a, 211b outputs a calculation result for n bits (n is an integer except 0) at each calculation cycle to an n output line, and outputs a final calculation result of m bits (m is an integer except 0) at the i-th operation cycle (i=1, 2, 3, 4, ...) to an m output line.

The calculation blocks 211a and 211b each output the calculation results of m+n*(i−1). The products-summing circuit of this embodiment performs addition/subtraction of calculation results of the two calculation blocks.

Each time a calculation cycle such as a predetermined multiplication is performed at each of the calculation blocks 211a and 211b, the calculation result for the n bits from the lower bit is outputted to the n output line. This calculation cycle continues from the first cycle to (i−1)-th cycle.

The calculation results for n bits at each calculation cycle from the calculation blocks are added together by an n-bit adder (inclusive of the case of a subtracter) 211. The addition (subtraction) result at each cycle by the adder (subtracter) 212 is accumulated in the established lower bit register 214. At each calculation cycle, the carry (borrow) used by the n-bit adder (subtracter) 212 is stored in a carry register 213. An output of the carry register 213 is used for the addition (subtraction) of the next cycle.

At the i-th cycle, the calculation block 211a, 211b outputs the calculation result of m bits to the m output line. The m-bit output at the i-th cycle is supplied to an m-bit adder (subtracter) 215 and added to (subtracted from) the carry (borrow) at the (i−1)-th cycle from the carry register Next, the lower n bits, n*(i−1) bits, are added to the lower bit positions of the m bits in the m-bit adder (subtracter) 215, to output the result as the final addition (subtraction) result of the calculation blocks 211a and 211b.

As described so far, according to the present invention, the calculation block of a products-summing circuit of a DCT processor has an adder/subtracter having the number of bits (lower bits) sufficient for each calculation cycle, and a register for storing an established portion of the addition/subtraction result at each calculation cycle. When a calculation result for the final bits (upper bits) is obtained, this final result is subjected to addition/subtraction to and from the value stored in the register. Therefore, addition/subtraction can be performed by using an adder/subtracter having a small number of bits, reducing the size of circuit hardware and speeding up the operation.

The present invention has been described in connection with the preferred embodiments. The present invention is not intended to be limited only to the embodiments, but it is apparent from those persons skilled in the art that various modifications, improvements, combinations and the like are possible.

TABLE 1

| CONTENTS OF LOOK-UP TABLE | | | | | | | | | |
|---|---|---|---|---|---|---|---|---|---|
| FORWARD DCT No. 0 | | | | | INVERSE DCT No. 0 | | | | |
| x4 | x3 | x2 | x1 | CONTENTS | x4 | x3 | x2 | x1 | CONTENTS |
| 0 | 0 | 0 | 0 | 0 | 0 | 0 | 0 | 0 | 0 |
| 0 | 0 | 0 | 1 | 4096 | 0 | 0 | 0 | 1 | 4096 |
| 0 | 0 | 1 | 0 | 4096 | 0 | 0 | 1 | 0 | 5352 |
| 0 | 0 | 1 | 1 | 8192 | 0 | 0 | 1 | 1 | 9448 |
| 0 | 1 | 0 | 0 | 4096 | 0 | 1 | 0 | 0 | 4096 |
| 0 | 1 | 0 | 1 | 8192 | 0 | 1 | 0 | 1 | 8192 |
| 0 | 1 | 1 | 0 | 8192 | 0 | 1 | 1 | 0 | 9448 |
| 0 | 1 | 1 | 1 | 12288 | 0 | 1 | 1 | 1 | 13544 |
| 1 | 0 | 0 | 0 | 4096 | 1 | 0 | 0 | 0 | 2217 |
| 1 | 0 | 0 | 1 | 8192 | 1 | 0 | 0 | 1 | 6313 |
| 1 | 0 | 1 | 0 | 8192 | 1 | 0 | 1 | 0 | 7569 |
| 1 | 0 | 1 | 1 | 12288 | 1 | 0 | 1 | 1 | 11665 |
| 1 | 1 | 0 | 0 | 8192 | 1 | 1 | 0 | 0 | 6313 |
| 1 | 1 | 0 | 1 | 12288 | 1 | 1 | 0 | 1 | 10409 |
| 1 | 1 | 1 | 0 | 12288 | 1 | 1 | 1 | 0 | 11665 |
| 1 | 1 | 1 | 1 | 16384 | 1 | 1 | 1 | 1 | 15761 |

TABLE 2

CONTENTS OF LOOK-UP TABLE

| FORWARD DCT No. 1 | | | | | INVERSE DCT No. 1 | | | | |
|---|---|---|---|---|---|---|---|---|---|
| x4 | x3 | x2 | x1 | CONTENTS | x4 | x3 | x2 | x1 | CONTENTS |
| 0 | 0 | 0 | 0 | 0 | 0 | 0 | 0 | 0 | 0 |
| 0 | 0 | 0 | 1 | 5681 | 0 | 0 | 0 | 1 | 5681 |
| 0 | 0 | 1 | 0 | 4816 | 0 | 0 | 1 | 0 | 4816 |
| 0 | 0 | 1 | 1 | 10497 | 0 | 0 | 1 | 1 | 10497 |
| 0 | 1 | 0 | 0 | 3218 | 0 | 1 | 0 | 0 | 3218 |
| 0 | 1 | 0 | 1 | 8899 | 0 | 1 | 0 | 1 | 8899 |
| 0 | 1 | 1 | 0 | 8034 | 0 | 1 | 1 | 0 | 8034 |
| 0 | 1 | 1 | 1 | 13715 | 0 | 1 | 1 | 1 | 13715 |
| 1 | 0 | 0 | 0 | 1130 | 1 | 0 | 0 | 0 | 1130 |
| 1 | 0 | 0 | 1 | 6811 | 1 | 0 | 0 | 1 | 6811 |
| 1 | 0 | 1 | 0 | 5946 | 1 | 0 | 1 | 0 | 5946 |
| 1 | 0 | 1 | 1 | 11627 | 1 | 0 | 1 | 1 | 11627 |
| 1 | 1 | 0 | 0 | 4348 | 1 | 1 | 0 | 0 | 4348 |
| 1 | 1 | 0 | 1 | 10029 | 1 | 1 | 0 | 1 | 10029 |
| 1 | 1 | 1 | 0 | 9164 | 1 | 1 | 1 | 0 | 9164 |
| 1 | 1 | 1 | 1 | 14845 | 1 | 1 | 1 | 1 | 14845 |

TABLE 3

CONTENTS OF LOOK-UP TABLE

| FORWARD DCT No. 2 | | | | | INVERSE DCT No. 2 | | | | |
|---|---|---|---|---|---|---|---|---|---|
| x4 | x3 | x2 | x1 | CONTENTS | x4 | x3 | x2 | x1 | CONTENTS |
| 0 | 0 | 0 | 0 | 0 | 0 | 0 | 0 | 0 | 0 |
| 0 | 0 | 0 | 1 | 5352 | 0 | 0 | 0 | 1 | 4096 |
| 0 | 0 | 1 | 0 | 2217 | 0 | 0 | 1 | 0 | 2217 |
| 0 | 0 | 1 | 1 | 7569 | 0 | 0 | 1 | 1 | 6313 |
| 0 | 1 | 0 | 0 | −2217 | 0 | 1 | 0 | 0 | −4096 |
| 0 | 1 | 0 | 1 | 3135 | 0 | 1 | 0 | 1 | 0 |
| 0 | 1 | 1 | 0 | 0 | 0 | 1 | 1 | 0 | −1879 |
| 0 | 1 | 1 | 1 | 5352 | 0 | 1 | 1 | 1 | 2217 |
| 1 | 0 | 0 | 0 | −5352 | 1 | 0 | 0 | 0 | −5352 |
| 1 | 0 | 0 | 1 | 0 | 1 | 0 | 0 | 1 | −1256 |
| 1 | 0 | 1 | 0 | −3135 | 1 | 0 | 1 | 0 | −3135 |
| 1 | 0 | 1 | 1 | 2217 | 1 | 0 | 1 | 1 | 961 |
| 1 | 1 | 0 | 0 | −7569 | 1 | 1 | 0 | 0 | −9448 |
| 1 | 1 | 0 | 1 | −2217 | 1 | 1 | 0 | 1 | −5352 |
| 1 | 1 | 1 | 0 | −5352 | 1 | 1 | 1 | 0 | −7231 |
| 1 | 1 | 1 | 1 | 0 | 1 | 1 | 1 | 1 | −3135 |

TABLE 4

CONTENTS OF LOOK-UP TABLE

| FORWARD DCT No. 3 | | | | | INVERSE DCT No. 3 | | | | |
|---|---|---|---|---|---|---|---|---|---|
| x4 | x3 | x2 | x1 | CONTENTS | x4 | x3 | x2 | x1 | CONTENTS |
| 0 | 0 | 0 | 0 | 0 | 0 | 0 | 0 | 0 | 0 |
| 0 | 0 | 0 | 1 | 4816 | 0 | 0 | 0 | 1 | 4816 |
| 0 | 0 | 1 | 0 | −1130 | 0 | 0 | 1 | 0 | −1130 |
| 0 | 0 | 1 | 1 | 3686 | 0 | 0 | 1 | 1 | 3686 |
| 0 | 1 | 0 | 0 | −5681 | 0 | 1 | 0 | 0 | −5681 |
| 0 | 1 | 0 | 1 | −865 | 0 | 1 | 0 | 1 | −865 |
| 0 | 1 | 1 | 0 | −6811 | 0 | 1 | 1 | 0 | −6811 |
| 0 | 1 | 1 | 1 | −1995 | 0 | 1 | 1 | 1 | −1995 |
| 1 | 0 | 0 | 0 | −3218 | 1 | 0 | 0 | 0 | −3218 |
| 1 | 0 | 0 | 1 | 1598 | 1 | 0 | 0 | 1 | 1598 |
| 1 | 0 | 1 | 0 | −4348 | 1 | 0 | 1 | 0 | −4348 |
| 1 | 0 | 1 | 1 | 468 | 1 | 0 | 1 | 1 | 468 |
| 1 | 1 | 0 | 0 | −8899 | 1 | 1 | 0 | 0 | −8899 |
| 1 | 1 | 0 | 1 | −4083 | 1 | 1 | 0 | 1 | −4083 |
| 1 | 1 | 1 | 0 | −10029 | 1 | 1 | 1 | 0 | −10029 |
| 1 | 1 | 1 | 1 | −5213 | 1 | 1 | 1 | 1 | −5213 |

TABLE 5

CONTENTS OF LOOK-UP TABLE

| FORWARD DCT No. 4 | | | | | INVERSE DCT No. 4 | | | | |
|---|---|---|---|---|---|---|---|---|---|
| x4 | x3 | x2 | x1 | CONTENTS | x4 | x3 | x2 | x1 | CONTENTS |
| 0 | 0 | 0 | 0 | 0 | 0 | 0 | 0 | 0 | 0 |
| 0 | 0 | 0 | 1 | 4096 | 0 | 0 | 0 | 1 | 4096 |
| 0 | 0 | 1 | 0 | −4096 | 0 | 0 | 1 | 0 | −2217 |
| 0 | 0 | 1 | 1 | 0 | 0 | 0 | 1 | 1 | 1879 |
| 0 | 1 | 0 | 0 | −4096 | 0 | 1 | 0 | 0 | −4096 |
| 0 | 1 | 0 | 1 | 0 | 0 | 1 | 0 | 1 | 0 |
| 0 | 1 | 1 | 0 | −8192 | 0 | 1 | 1 | 0 | −6313 |
| 0 | 1 | 1 | 1 | −4096 | 0 | 1 | 1 | 1 | −2217 |
| 1 | 0 | 0 | 0 | 4096 | 1 | 0 | 0 | 0 | 5352 |
| 1 | 0 | 0 | 1 | 8192 | 1 | 0 | 0 | 1 | 9448 |
| 1 | 0 | 1 | 0 | 0 | 1 | 0 | 1 | 0 | 3135 |
| 1 | 0 | 1 | 1 | 4096 | 1 | 0 | 1 | 1 | 7231 |
| 1 | 1 | 0 | 0 | 0 | 1 | 1 | 0 | 0 | 1256 |
| 1 | 1 | 0 | 1 | 4096 | 1 | 1 | 0 | 1 | 5352 |
| 1 | 1 | 1 | 0 | −4096 | 1 | 1 | 1 | 0 | −961 |
| 1 | 1 | 1 | 1 | 0 | 1 | 1 | 1 | 1 | 3135 |

TABLE 6

CONTENTS OF LOOK-UP TABLE

| FORWARD DCT No. 5 | | | | | INVERSE DCT No. 5 | | | | |
|---|---|---|---|---|---|---|---|---|---|
| x4 | x3 | x2 | x1 | CONTENTS | x4 | x3 | x2 | x1 | CONTENTS |
| 0 | 0 | 0 | 0 | 0 | 0 | 0 | 0 | 0 | 0 |
| 0 | 0 | 0 | 1 | 3218 | 0 | 0 | 0 | 1 | 3218 |
| 0 | 0 | 1 | 0 | −5681 | 0 | 0 | 1 | 0 | −5681 |
| 0 | 0 | 1 | 1 | −2463 | 0 | 0 | 1 | 1 | −2463 |
| 0 | 1 | 0 | 0 | 1130 | 0 | 1 | 0 | 0 | 1130 |
| 0 | 1 | 0 | 1 | 4348 | 0 | 1 | 0 | 1 | 4348 |
| 0 | 1 | 1 | 0 | −4551 | 0 | 1 | 1 | 0 | −4551 |
| 0 | 1 | 1 | 1 | −1333 | 0 | 1 | 1 | 1 | −1333 |
| 1 | 0 | 0 | 0 | 4816 | 1 | 0 | 0 | 0 | 4816 |
| 1 | 0 | 0 | 1 | 8034 | 1 | 0 | 0 | 1 | 8034 |
| 1 | 0 | 1 | 0 | −865 | 1 | 0 | 1 | 0 | −865 |
| 1 | 0 | 1 | 1 | 2353 | 1 | 0 | 1 | 1 | 2353 |
| 1 | 1 | 0 | 0 | 5946 | 1 | 1 | 0 | 0 | 5946 |
| 1 | 1 | 0 | 1 | 9164 | 1 | 1 | 0 | 1 | 9164 |
| 1 | 1 | 1 | 0 | 265 | 1 | 1 | 1 | 0 | 265 |
| 1 | 1 | 1 | 1 | 3483 | 1 | 1 | 1 | 1 | 3483 |

TABLE 7

CONTENTS OF LOOK-UP TABLE

| FORWARD DCT No. 6 | | | | | INVERSE DCT No. 6 | | | | |
|---|---|---|---|---|---|---|---|---|---|
| x4 | x3 | x2 | x1 | CONTENTS | x4 | x3 | x2 | x1 | CONTENTS |
| 0 | 0 | 0 | 0 | 0 | 0 | 0 | 0 | 0 | 0 |
| 0 | 0 | 0 | 1 | 2217 | 0 | 0 | 0 | 1 | 4096 |
| 0 | 0 | 1 | 0 | −5352 | 0 | 0 | 1 | 0 | −5352 |
| 0 | 0 | 1 | 1 | −3135 | 0 | 0 | 1 | 1 | −1256 |
| 0 | 1 | 0 | 0 | 5352 | 0 | 1 | 0 | 0 | 4096 |
| 0 | 1 | 0 | 1 | 7569 | 0 | 1 | 0 | 1 | 8192 |
| 0 | 1 | 1 | 0 | 0 | 0 | 1 | 1 | 0 | −1256 |
| 0 | 1 | 1 | 1 | 2217 | 0 | 1 | 1 | 1 | 2840 |
| 1 | 0 | 0 | 0 | −2217 | 1 | 0 | 0 | 0 | −2217 |
| 1 | 0 | 0 | 1 | 0 | 1 | 0 | 0 | 1 | 1879 |
| 1 | 0 | 1 | 0 | −7569 | 1 | 0 | 1 | 0 | −7569 |
| 1 | 0 | 1 | 1 | −5352 | 1 | 0 | 1 | 1 | −3473 |
| 1 | 1 | 0 | 0 | 3135 | 1 | 1 | 0 | 0 | 1879 |
| 1 | 1 | 0 | 1 | 5352 | 1 | 1 | 0 | 1 | 5975 |
| 1 | 1 | 1 | 0 | −2217 | 1 | 1 | 1 | 0 | −3473 |
| 1 | 1 | 1 | 1 | 0 | 1 | 1 | 1 | 1 | 623 |

TABLE 8

CONTENTS OF LOOK-UP TABLE

| FORWARD DCT No. 7 | | | | | INVERSE DCT No. 7 | | | | |
|---|---|---|---|---|---|---|---|---|---|
| x4 | x3 | x2 | x1 | CONTENTS | x4 | x3 | x2 | x1 | CONTENTS |
| 0 | 0 | 0 | 0 | 0 | 0 | 0 | 0 | 0 | 0 |
| 0 | 0 | 0 | 1 | 1130 | 0 | 0 | 0 | 1 | 1130 |
| 0 | 0 | 1 | 0 | −3218 | 0 | 0 | 1 | 0 | −3218 |
| 0 | 0 | 1 | 1 | −2088 | 0 | 0 | 1 | 1 | −2088 |

TABLE 8-continued

CONTENTS OF LOOK-UP TABLE

| FORWARD DCT No. 7 | | | | | INVERSE DCT No. 7 | | | | |
|---|---|---|---|---|---|---|---|---|---|
| x4 | x3 | x2 | x1 | CONTENTS | x4 | x3 | x2 | x1 | CONTENTS |
| 0 | 1 | 0 | 0 | 4816 | 0 | 1 | 0 | 0 | 4816 |
| 0 | 1 | 0 | 1 | 5946 | 0 | 1 | 0 | 1 | 5946 |
| 0 | 1 | 1 | 0 | 1598 | 0 | 1 | 1 | 0 | 1598 |
| 0 | 1 | 1 | 1 | 2728 | 0 | 1 | 1 | 1 | 2728 |
| 1 | 0 | 0 | 0 | −5681 | 1 | 0 | 0 | 0 | −5681 |
| 1 | 0 | 0 | 1 | −4551 | 1 | 0 | 0 | 1 | −4551 |
| 1 | 0 | 1 | 0 | −8899 | 1 | 0 | 1 | 0 | −8899 |
| 1 | 0 | 1 | 1 | −7769 | 1 | 0 | 1 | 1 | −7769 |
| 1 | 1 | 0 | 0 | −865 | 1 | 1 | 0 | 0 | −865 |
| 1 | 1 | 0 | 1 | 265 | 1 | 1 | 0 | 1 | 265 |
| 1 | 1 | 1 | 0 | −4083 | 1 | 1 | 1 | 0 | −4083 |
| 1 | 1 | 1 | 1 | −2953 | 1 | 1 | 1 | 1 | −2953 |

TABLE 9

CONTENTS OF LOOK-UP TABLE BY COMBINATIONS OF TWO KINDS, EACH OF TWO BITS

| FORWARD DCT No. 0 | | | | | | | INVERSE DCT No. 0 | | | | | |
|---|---|---|---|---|---|---|---|---|---|---|---|---|
| | | | | CONTENTS | | | | | | | CONTENTS | |
| b2 | b1 | a2 | a1 | 1.3 | 2.4 | (a + b) * 2$^{12}$ | b2 | b1 | a2 | a1 | 1.3 | 2.4 |
| 0 | 0 | 0 | 0 | 0 | 0 | 0 | 0 | 0 | 0 | 0 | 0 | 0 |
| 0 | 0 | 0 | 1 | 4096 | 4096 | 1 | 0 | 0 | 0 | 1 | 4096 | 5352 |
| 0 | 0 | 1 | 0 | 8192 | 8192 | 2 | 0 | 0 | 1 | 0 | 8192 | 10704 |
| 0 | 0 | 1 | 1 | 12288 | 12288 | 3 | 0 | 0 | 1 | 1 | 12288 | 16056 |
| 0 | 1 | 0 | 0 | 4096 | 4096 | 1 | 0 | 1 | 0 | 0 | 4096 | 2217 |
| 0 | 1 | 0 | 1 | 8192 | 8192 | 2 | 0 | 1 | 0 | 1 | 8192 | 7569 |
| 0 | 1 | 1 | 0 | 12288 | 12288 | 3 | 0 | 1 | 1 | 0 | 12288 | 12921 |
| 0 | 1 | 1 | 1 | 16384 | 16384 | 4 | 0 | 1 | 1 | 1 | 16384 | 18273 |
| 1 | 0 | 0 | 0 | 8192 | 8192 | 2 | 1 | 0 | 0 | 0 | 8192 | 4434 |
| 1 | 0 | 0 | 1 | 12288 | 12288 | 3 | 1 | 0 | 0 | 1 | 12288 | 9786 |
| 1 | 0 | 1 | 0 | 16384 | 16384 | 4 | 1 | 0 | 1 | 0 | 16384 | 15138 |
| 1 | 0 | 1 | 1 | 20480 | 20480 | 5 | 1 | 0 | 1 | 1 | 20480 | 20490 |
| 1 | 1 | 0 | 0 | 12288 | 12288 | 3 | 1 | 1 | 0 | 0 | 12288 | 6651 |
| 1 | 1 | 0 | 1 | 16384 | 16384 | 4 | 1 | 1 | 0 | 1 | 16384 | 12003 |
| 1 | 1 | 1 | 0 | 20480 | 20480 | 5 | 1 | 1 | 1 | 0 | 20480 | 17355 |
| 1 | 1 | 1 | 1 | 24576 | 24576 | 6 | 1 | 1 | 1 | 1 | 24576 | 22707 |

TABLE 10

CONTENTS OF LOOK-UP TABLE BY COMBINATIONS OF TWO KINDS, EACH OF TWO BITS

| FORWARD DCT No. 1 | | | | | | INVERSE DCT No. 1 | | | | | |
|---|---|---|---|---|---|---|---|---|---|---|---|
| | | | | CONTENTS | | | | | | CONTENTS | |
| b2 | b1 | a2 | a1 | 1.3 | 2.4 | b2 | b1 | a2 | a1 | 1.3 | 2.4 |
| 0 | 0 | 0 | 0 | 0 | 0 | 0 | 0 | 0 | 0 | 0 | 0 |
| 0 | 0 | 0 | 1 | 5681 | 4816 | 0 | 0 | 0 | 1 | 5681 | 4816 |
| 0 | 0 | 1 | 0 | 11362 | 9632 | 0 | 0 | 1 | 0 | 11362 | 9632 |
| 0 | 0 | 1 | 1 | 17043 | 14448 | 0 | 0 | 1 | 1 | 17043 | 14448 |
| 0 | 1 | 0 | 0 | 3218 | 1130 | 0 | 1 | 0 | 0 | 3218 | 1130 |
| 0 | 1 | 0 | 1 | 8899 | 5946 | 0 | 1 | 0 | 1 | 8899 | 5946 |
| 0 | 1 | 1 | 0 | 14580 | 10762 | 0 | 1 | 1 | 0 | 14580 | 10762 |
| 0 | 1 | 1 | 1 | 20261 | 15578 | 0 | 1 | 1 | 1 | 20261 | 15578 |
| 1 | 0 | 0 | 0 | 6436 | 2260 | 1 | 0 | 0 | 0 | 6436 | 2260 |
| 1 | 0 | 0 | 1 | 12117 | 7076 | 1 | 0 | 0 | 1 | 12117 | 7076 |
| 1 | 0 | 1 | 0 | 17798 | 11892 | 1 | 0 | 1 | 0 | 17798 | 11892 |
| 1 | 0 | 1 | 1 | 23479 | 16708 | 1 | 0 | 1 | 1 | 23479 | 16708 |
| 1 | 1 | 0 | 0 | 9654 | 3390 | 1 | 1 | 0 | 0 | 9654 | 3390 |
| 1 | 1 | 0 | 1 | 15335 | 8206 | 1 | 1 | 0 | 1 | 15335 | 8206 |
| 1 | 1 | 1 | 0 | 21016 | 13022 | 1 | 1 | 1 | 0 | 21016 | 13022 |
| 1 | 1 | 1 | 1 | 26697 | 17838 | 1 | 1 | 1 | 1 | 26697 | 17838 |

TABLE 11

CONTENTS OF LOOK-UP TABLE BY COMBINATIONS OF TWO KINDS, EACH OF TWO BITS

| FORWARD DCT | | | | | | INVERSE DCT | | | | | | |
|---|---|---|---|---|---|---|---|---|---|---|---|---|
| No. 2 | | | | CONTENTS | | No. 2 | | | | CONTENTS | | |
| b2 | b1 | a2 | a1 | 1.3 | 2.4 | b2 | b1 | a2 | a1 | 1.3 | 2.4 | (a − b) * $2^{12}$ |
| 0 | 0 | 0 | 0 | 0 | 0 | 0 | 0 | 0 | 0 | 0 | 0 | 0 |
| 0 | 0 | 0 | 1 | 5352 | 2217 | 0 | 0 | 0 | 1 | 4096 | 2217 | 1 |
| 0 | 0 | 1 | 0 | 10704 | 4434 | 0 | 0 | 1 | 0 | 8192 | 4434 | 2 |
| 0 | 0 | 1 | 1 | 16056 | 6651 | 0 | 0 | 1 | 1 | 12288 | 6651 | 3 |
| 0 | 1 | 0 | 0 | −2217 | −5352 | 0 | 1 | 0 | 0 | −4096 | −5352 | −1 |
| 0 | 1 | 0 | 1 | 3135 | −3135 | 0 | 1 | 0 | 1 | 0 | −3135 | 0 |
| 0 | 1 | 1 | 0 | 8487 | −918 | 0 | 1 | 1 | 0 | 4096 | −918 | 1 |
| 0 | 1 | 1 | 1 | 13839 | 1299 | 0 | 1 | 1 | 1 | 8192 | 1299 | 2 |
| 1 | 0 | 0 | 0 | −4434 | −10704 | 1 | 0 | 0 | 0 | −8192 | −10704 | −2 |
| 1 | 0 | 0 | 1 | 918 | −8487 | 1 | 0 | 0 | 1 | −4096 | −8487 | −1 |
| 1 | 0 | 1 | 0 | 6270 | −6270 | 1 | 0 | 1 | 0 | 0 | −6270 | 0 |
| 1 | 0 | 1 | 1 | 11622 | −4053 | 1 | 0 | 1 | 1 | 4096 | −4053 | 1 |
| 1 | 0 | 0 | 0 | −6651 | −16056 | 1 | 1 | 0 | 0 | −12288 | −16056 | −3 |
| 1 | 0 | 0 | 1 | −1299 | −13839 | 1 | 1 | 0 | 1 | −8192 | −13839 | −2 |
| 1 | 0 | 1 | 0 | 4053 | −11622 | 1 | 1 | 1 | 0 | −4096 | −11622 | −1 |
| 1 | 0 | 1 | 1 | 9405 | −9405 | 1 | 1 | 1 | 1 | 0 | −9405 | 0 |

TABLE 12

CONTENTS OF LOOK-UP TABLE BY COMBINATIONS OF TWO KINDS, EACH OF TWO BITS

| FORWARD DCT No. 3 | | | | | | INVERSE DCT No. 3 | | | | | |
|---|---|---|---|---|---|---|---|---|---|---|---|
| | | | | CONTENTS | | | | | | CONTENTS | |
| b2 | b1 | a2 | a1 | 1.3 | 2.4 | b2 | b1 | a2 | a1 | 1.3 | 2.4 |
| 0 | 0 | 0 | 0 | 0 | 0 | 0 | 0 | 0 | 0 | 0 | 0 |
| 0 | 0 | 0 | 1 | 4816 | −1130 | 0 | 0 | 0 | 1 | 4817 | −1130 |
| 0 | 0 | 1 | 0 | 9632 | −2260 | 0 | 0 | 1 | 0 | 9632 | −2260 |
| 0 | 0 | 1 | 1 | 14448 | −3390 | 0 | 0 | 1 | 1 | 14449 | −3390 |
| 0 | 1 | 0 | 0 | −5681 | −3218 | 0 | 1 | 0 | 0 | −5681 | −3218 |
| 0 | 1 | 0 | 1 | −865 | −4348 | 0 | 1 | 0 | 1 | −864 | −4348 |
| 0 | 1 | 1 | 0 | 3951 | −5478 | 0 | 1 | 1 | 0 | 3951 | −5478 |
| 0 | 1 | 1 | 1 | 8767 | −6608 | 0 | 1 | 1 | 1 | 8768 | −6608 |
| 1 | 0 | 0 | 0 | −11362 | −6436 | 1 | 0 | 0 | 0 | −11362 | −6436 |
| 1 | 0 | 0 | 1 | −6546 | −7566 | 1 | 0 | 0 | 1 | −6545 | −7566 |
| 1 | 0 | 1 | 0 | −1730 | −8696 | 1 | 0 | 1 | 0 | −1730 | −8696 |
| 1 | 0 | 1 | 1 | 3086 | −9826 | 1 | 0 | 1 | 1 | 3087 | −9826 |
| 1 | 1 | 0 | 0 | −17043 | −9654 | 1 | 1 | 0 | 0 | −17043 | −9654 |
| 1 | 1 | 0 | 1 | −12227 | −10784 | 1 | 1 | 0 | 1 | −12226 | −10784 |
| 1 | 1 | 1 | 0 | −7411 | −11914 | 1 | 1 | 1 | 0 | −7411 | −11914 |
| 1 | 1 | 1 | 1 | −2595 | −13044 | 1 | 1 | 1 | 1 | −2594 | −13044 |

TABLE 13

CONTENTS OF LOOK-UP TABLE BY COMBINATIONS OF TWO KINDS, EACH OF TWO BITS

| FORWARD DCT | | | | | | | INVERSE DCT | | | | | |
|---|---|---|---|---|---|---|---|---|---|---|---|---|
| No. 4 | | | | CONTENTS | | | No. 4 | | | | CONTENTS | |
| b2 | b1 | a2 | a1 | 1.3 | 2.4 | (b − a) * $2^{12}$ | b2 | b1 | a2 | a1 | 1.3 | 2.4 |
| 0 | 0 | 0 | 0 | 0 | 0 | 0 | 0 | 0 | 0 | 0 | 0 | 0 |
| 0 | 0 | 0 | 1 | 4096 | −4096 | −1 | 0 | 0 | 0 | 1 | 4096 | −2217 |
| 0 | 0 | 1 | 0 | 8192 | −8192 | −2 | 0 | 0 | 1 | 0 | 8192 | −4434 |
| 0 | 0 | 1 | 1 | 12288 | −12288 | −3 | 0 | 0 | 1 | 1 | 12288 | −6651 |
| 0 | 1 | 0 | 0 | −4096 | 4096 | 1 | 0 | 1 | 0 | 0 | −4096 | 5352 |
| 0 | 1 | 0 | 1 | 0 | 0 | 0 | 0 | 1 | 0 | 1 | 0 | 3135 |
| 0 | 1 | 1 | 0 | 4096 | −4096 | −1 | 0 | 1 | 1 | 0 | 4096 | 918 |
| 0 | 1 | 1 | 1 | 8192 | −8192 | −2 | 0 | 1 | 1 | 1 | 8192 | −1299 |
| 1 | 0 | 0 | 0 | −8192 | 8192 | 2 | 1 | 0 | 0 | 0 | −8192 | 10704 |
| 1 | 0 | 0 | 1 | −4096 | 4096 | 1 | 1 | 0 | 0 | 1 | −4096 | 8487 |
| 1 | 0 | 1 | 0 | 0 | 0 | 0 | 1 | 0 | 1 | 0 | 0 | 6270 |
| 1 | 0 | 1 | 1 | 4096 | −4096 | −1 | 1 | 0 | 1 | 1 | 4096 | 4053 |

TABLE 13-continued

CONTENTS OF LOOK-UP TABLE BY COMBINATIONS OF TWO KINDS, EACH OF TWO BITS

| FORWARD DCT | | | | | | | INVERSE DCT | | | | | |
|---|---|---|---|---|---|---|---|---|---|---|---|---|
| No. 4 | | | | CONTENTS | | | No. 4 | | | | CONTENTS | |
| b2 | b1 | a2 | a1 | 1.3 | 2.4 | $(b - a) * 2^{12}$ | b2 | b1 | a2 | a1 | 1.3 | 2.4 |
| 1 | 1 | 0 | 0 | −12288 | 12288 | 3 | 1 | 1 | 0 | 0 | −12288 | 16056 |
| 1 | 1 | 0 | 1 | −8192 | 8192 | 2 | 1 | 1 | 0 | 1 | −8192 | 13839 |
| 1 | 1 | 1 | 0 | −4096 | 4096 | 1 | 1 | 1 | 1 | 0 | −4096 | 11622 |
| 1 | 1 | 1 | 1 | 0 | 0 | 0 | 1 | 1 | 1 | 1 | 0 | 9405 |

TABLE 14

CONTENTS OF LOOK-UP TABLE BY COMBINATIONS OF TWO KINDS, EACH OF TWO BITS

| FORWARD DCT | | | | | | INVERSE DCT | | | | | |
|---|---|---|---|---|---|---|---|---|---|---|---|
| No. 5 | | | | | | No. 5 | | | | | |
| | | | | CONTENTS | | | | | | CONTENTS | |
| b2 | b1 | a2 | a1 | 1.3 | 2.4 | b2 | b1 | a2 | a1 | 1.3 | 2.4 |
| 0 | 0 | 0 | 0 | 0 | 0 | 0 | 0 | 0 | 0 | 0 | 0 |
| 0 | 0 | 0 | 1 | 3218 | −5681 | 0 | 0 | 0 | 1 | 3218 | −5681 |
| 0 | 0 | 1 | 0 | 6436 | −11362 | 0 | 0 | 1 | 0 | 6436 | −11362 |
| 0 | 0 | 1 | 1 | 9654 | −17043 | 0 | 0 | 1 | 1 | 9654 | −17043 |
| 0 | 1 | 0 | 0 | 1130 | 4816 | 0 | 1 | 0 | 0 | 1130 | 4816 |
| 0 | 1 | 0 | 1 | 4348 | −865 | 0 | 1 | 0 | 1 | 4348 | −865 |
| 0 | 1 | 1 | 0 | 7566 | −6546 | 0 | 1 | 1 | 0 | 7566 | −6546 |
| 0 | 1 | 1 | 1 | 10784 | −12227 | 0 | 1 | 1 | 1 | 10784 | −12227 |
| 1 | 0 | 0 | 0 | 2260 | 9632 | 1 | 0 | 0 | 0 | 2260 | 9632 |
| 1 | 0 | 0 | 1 | 5478 | 3951 | 1 | 0 | 0 | 1 | 5478 | 3951 |
| 1 | 0 | 1 | 0 | 8696 | −1730 | 1 | 0 | 1 | 0 | 8696 | −1730 |
| 1 | 0 | 1 | 1 | 11914 | −7411 | 1 | 0 | 1 | 1 | 11914 | −7411 |
| 1 | 1 | 0 | 0 | 3390 | 14448 | 1 | 1 | 0 | 0 | 3390 | 14448 |
| 1 | 1 | 0 | 1 | 6608 | 8767 | 1 | 1 | 0 | 1 | 6608 | 8767 |
| 1 | 1 | 1 | 0 | 9826 | 3086 | 1 | 1 | 1 | 0 | 9826 | 3086 |
| 1 | 1 | 1 | 1 | 13044 | −2595 | 1 | 1 | 1 | 1 | 13044 | −2595 |

TABLE 15

CONTENTS OF LOOK-UP TABLE BY COMBINATIONS OF TWO KINDS, EACH OF TWO BITS

| FORWARD DCT | | | | | | | INVERSE DCT | | | | | | |
|---|---|---|---|---|---|---|---|---|---|---|---|---|---|
| No. 6 | | | | CONTENTS | | | No. 6 | | | | CONTENTS | | |
| b2 | b1 | a2 | a1 | 1.3 | 2.4 | | b2 | b1 | a2 | a1 | 1.3 | 2.4 | $(a + b) * 2^{12}$ |
| 0 | 0 | 0 | 0 | 0 | 0 | | 0 | 0 | 0 | 0 | 0 | 0 | 0 |
| 0 | 0 | 0 | 1 | 2217 | −5352 | | 0 | 0 | 0 | 1 | 4096 | −5352 | 1 |
| 0 | 0 | 1 | 0 | 4434 | −10704 | | 0 | 0 | 1 | 0 | 8192 | −10704 | 2 |
| 0 | 0 | 1 | 1 | 6651 | −16056 | | 0 | 0 | 1 | 1 | 12288 | −16056 | 3 |
| 0 | 1 | 0 | 0 | 5352 | −2217 | | 0 | 1 | 0 | 0 | 4096 | −2217 | 1 |
| 0 | 1 | 0 | 1 | 7569 | −7569 | | 0 | 1 | 0 | 1 | 8192 | −7569 | 2 |
| 0 | 1 | 1 | 0 | 9786 | −12921 | | 0 | 1 | 1 | 0 | 12288 | −12921 | 3 |
| 0 | 1 | 1 | 1 | 12003 | −18273 | | 0 | 1 | 1 | 1 | 16384 | −18273 | 4 |
| 1 | 0 | 0 | 0 | 10704 | −4434 | | 1 | 0 | 0 | 0 | 8192 | −4434 | 2 |
| 1 | 0 | 0 | 1 | 12921 | −9786 | | 1 | 0 | 0 | 1 | 12288 | −9786 | 3 |
| 1 | 0 | 1 | 0 | 15138 | −15138 | | 1 | 0 | 1 | 0 | 16384 | −15138 | 4 |
| 1 | 0 | 1 | 1 | 17355 | −20490 | | 1 | 0 | 1 | 1 | 20480 | −20490 | 5 |
| 1 | 1 | 0 | 0 | 16056 | −6651 | | 1 | 1 | 0 | 0 | 12288 | −6651 | 3 |
| 1 | 1 | 0 | 1 | 18273 | −12003 | | 1 | 1 | 0 | 1 | 16384 | −12003 | 4 |
| 1 | 1 | 1 | 0 | 20490 | −17355 | | 1 | 1 | 1 | 0 | 20480 | −17355 | 5 |
| 1 | 1 | 1 | 1 | 22707 | −22707 | | 1 | 1 | 1 | 1 | 24576 | −22707 | 6 |

TABLE 16

CONTENTS OF LOOK-UP TABLE BY COMBINATIONS OF TWO KINDS, EACH OF TWO BITS

| FORWARD DCT | | | | | | INVERSE DCT | | | | | | |
|---|---|---|---|---|---|---|---|---|---|---|---|---|
| No. 7 | | | | | | No. 7 | | | | | | |
| | | | | CONTENTS | | | | | | CONTENTS | | |
| b2 | b1 | a2 | a1 | 1.3 | 2.4 | b2 | b1 | a2 | a1 | 1.3 | 2.4 | $(a + b) * 2^{12}$ |
| 0 | 0 | 0 | 0 | 0 | 0 | 0 | 0 | 0 | 0 | 0 | 0 | 0 |
| 0 | 0 | 0 | 1 | 1130 | −3218 | 0 | 0 | 0 | 1 | 1130 | −3218 | 1 |

TABLE 16-continued

CONTENTS OF LOOK-UP TABLE BY COMBINATIONS OF TWO
KINDS, EACH OF TWO BITS

| FORWARD DCT No. 7 | | | | | | INVERSE DCT No. 7 | | | | | |
|---|---|---|---|---|---|---|---|---|---|---|---|
| | | | | CONTENTS | | | | | | CONTENTS | |
| b2 | b1 | a2 | a1 | 1.3 | 2.4 | b2 | b1 | a2 | a1 | 1.3 | 2.4 | $(a + b) * 2^{12}$ |
| 0 | 0 | 1 | 0 | 2260 | −6436 | 0 | 0 | 1 | 0 | 2260 | −6436 | 2 |
| 0 | 0 | 1 | 1 | 3390 | −9654 | 0 | 0 | 1 | 1 | 3390 | −9654 | 3 |
| 0 | 1 | 0 | 0 | 4816 | −5681 | 0 | 1 | 0 | 0 | 4816 | −5681 | 1 |
| 0 | 1 | 0 | 1 | 5946 | −8899 | 0 | 1 | 0 | 1 | 5946 | −8899 | 2 |
| 0 | 1 | 1 | 0 | 7076 | −12117 | 0 | 1 | 1 | 0 | 7076 | −12117 | 3 |
| 0 | 1 | 1 | 1 | 8206 | −15335 | 0 | 1 | 1 | 1 | 8206 | −15335 | 4 |
| 1 | 0 | 0 | 0 | 9632 | −11362 | 1 | 0 | 0 | 0 | 9632 | −11362 | 2 |
| 1 | 0 | 0 | 1 | 10762 | −14580 | 1 | 0 | 0 | 1 | 10762 | −14580 | 3 |
| 1 | 0 | 1 | 0 | 11892 | −17798 | 1 | 0 | 1 | 0 | 11892 | −17798 | 4 |
| 1 | 0 | 1 | 1 | 13022 | −21016 | 1 | 0 | 1 | 1 | 13022 | −21016 | 5 |
| 1 | 1 | 0 | 0 | 14448 | −17043 | 1 | 1 | 0 | 0 | 14448 | −17043 | 3 |
| 1 | 1 | 0 | 1 | 15578 | −20261 | 1 | 1 | 0 | 1 | 15578 | −20261 | 4 |
| 1 | 1 | 1 | 0 | 16708 | −23479 | 1 | 1 | 1 | 0 | 16708 | −23479 | 5 |
| 1 | 1 | 1 | 1 | 17838 | −26697 | 1 | 1 | 1 | 1 | 17838 | −26697 | 6 |

I claim:

1. A discrete cosine transformation processor comprising:

a first one-dimensional discrete cosine transformation circuit comprising a first one-dimensional discrete cosine processing circuit, a first pre-processing circuit connected to an input of said first one-dimensional discrete cosine processing circuit, and a first post-processing circuit connected to an output of said first one-dimensional discrete cosine processing circuit;

a transpose circuit;

a second one-dimensional cosine transformation circuit comprising a second one-dimensional discrete cosine processing circuit, a second pre-processing circuit connected to an input of said second one-dimensional discrete cosine processing circuit, and a second post-processing circuit connected to an output of said second one-dimensional discrete cosine processing circuit, wherein said first pre-processing circuit of said first one-dimensional discrete cosine transformation circuit and said second post-processing circuit of said second one-dimensional discrete cosine transformation circuit comprises a shared first butterfly circuit, and said first post-processing circuit of said first one-dimensional discrete cosine transformation circuit and said second pre-processing circuit of said second one-dimensional discrete cosine transformation circuit comprises a shared second butterfly circuit, and wherein said transpose circuit is coupled to an output of said first one-dimensional discrete cosine transformation circuit and to an output of said second one-dimensional discrete cosine transformation circuit.

2. A discrete cosine transformation processor according to claim 1, further comprising input means, coupled to said first one-dimensional discrete cosine transformation circuit, for receiving an input signal, wherein at least one of said first and second one-dimensional discrete cosine transformation circuits comprises means for storing a look-up table having an input coupled to two bits of each of two elements of said input signal.

3. A discrete cosine transformation processor according to claim 1, further comprising input means, coupled to said first one-dimensional discrete cosine transformation circuit, for receiving an input signal, wherein said discrete cosine transformation is performed on said input signal of an 8*8 block size.

4. A discrete cosine transformation processor according to claim 3, wherein each of said first and second one-dimensional discrete cosine transformation circuits comprises means for storing a look-up table having an input coupled to two bits of each of two elements of said input signal, and means for storing twelve look-up tables that are commonly used both for forward discrete cosine transformation and inverse discrete cosine transformation.

5. A discrete cosine transformation processor according to claim 1, wherein at least one of said first and second one-dimensional discrete cosine transformation circuit comprises:

a calculation circuit for sequentially performing a discrete cosine transformation calculation for a predetermined bit position of each of a set of input signals;

an adder/subtracter connected to the output of said calculation circuit;

a shift register for sequentially storing a portion of an output signal of said adder/subtracter; and a register for sequentially storing a carry portion to be used for the addition/subtraction at a next calculation cycle.

6. A discrete cosine transformation processor comprising means for sampling two bits of each element of input data having a plurality of elements, and means for performing a forward/inverse cosine transformation (DCT) by using look-up tables, each look-up table being used for two bits of each of two elements of a forward DCT matrix and an inverse DCT matrix.

7. A discrete cosine transformation processor according claim 6, wherein said discrete cosine transformation is performed on said input data having an 8*8 block size, and said look-up tables include twelve look-up tables commonly used for both the forward DCT and inverse DCT.

8. A discrete cosine transformation processor according to claim 7, further comprising a bit shift coefficient circuit for bypassing said input data of a predetermined element.

9. A discrete cosine transformation processor according to claim 6, further comprising a bit shift coefficient circuit for by passing said input data of a predetermined element.

10. A discrete cosine transformation processor for performing a discrete cosine transformation, comprising:

a calculation circuit for sequentially performing a discrete cosine transformation calculation for a predetermined bit position of each of a set of input signals;

an adder/subtracter connected to the output of said calculation circuit;

a shift register for sequentially storing a portion of an output signal of said adder/subtracter; and a resister for sequentially storing a carry portion used for the addition/subtraction at a next calculation cycle.

11. A discrete cosine transformation processor with a products-summing circuit for performing a discrete cosine transformation, said products-summing circuit comprising:

a plurality for calculation circuits, each including means for sequentially performing a discrete cosine transformation calculation for n bits (n is an interger except 0) from a lower bit at each cycle of a predetermined calculation procedure, and means for performing a discrete cosine transformation calculation for remaining upper m bits (m is an integer except 0) at an i-th cycle, (i is an interger except 0) of the calculation procedure;

a first adder/subtracter for adding/subtracting the calculation result for the n bits obtained by each of said plurality of calculation circuits to/from the calculation result at the preceding cycle in accordance with a carry of the preceding cycle;

a second adder/subtracter for adding/subtracting the calculation result for the m bits obtained by each of said plurality of calculation circuits to/from the calculation result at the preceding cycle in accordance with a carry of the preceding cycle;

a register for sequentially storing the calculation result of said first adder/subtracter; and output means for adding the contents of said register to an output of said second adder/subtracter while aligning the bit positions, and outputting the result.

* * * * *